(12) United States Patent
Dearing

(10) Patent No.: US 11,710,092 B2
(45) Date of Patent: Jul. 25, 2023

(54) MOVABLE ITEM RECEPTACLES

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 189 days.

(21) Appl. No.: 17/013,254

(22) Filed: Sep. 4, 2020

(65) Prior Publication Data

US 2021/0073716 A1    Mar. 11, 2021

Related U.S. Application Data

(60) Provisional application No. 62/896,789, filed on Sep. 6, 2019.

(51) Int. Cl.
  *G06Q 10/083*    (2023.01)
  *G07C 9/00*    (2020.01)

(52) U.S. Cl.
  CPC ....... *G06Q 10/083* (2013.01); *G07C 9/00174* (2013.01)

(58) Field of Classification Search
  CPC ............. G06Q 10/083; G06Q 10/0832; G06Q 10/0833; G06Q 10/0835; G06Q 10/0836; G06Q 10/0837; G06Q 10/0838
  See application file for complete search history.

(56) References Cited

U.S. PATENT DOCUMENTS

| | | |
|---|---|---|
| 9,211,025 B1 | 12/2015 | Elhawwashy |
| 10,703,507 B2 | 7/2020 | Comerford |
| 2015/0158599 A1 | 6/2015 | Sisko |
| 2015/0175276 A1 | 6/2015 | Koster |
| 2015/0183528 A1 | 7/2015 | Walsh et al. |
| 2016/0117934 A1* | 4/2016 | Soundararajan ..... G05D 1/0202 701/3 |
| 2016/0159496 A1 | 6/2016 | O'Toole |

(Continued)

FOREIGN PATENT DOCUMENTS

| | | |
|---|---|---|
| ES | 1135980 U | 2/2015 |
| WO | WO 2015/095948 A1 | 7/2015 |
| WO | WO 2017/041145 A1 | 3/2017 |

OTHER PUBLICATIONS

Faugere, Louis, and Benoit Montreuil. "Hyperconnected pickup & delivery locker networks." Proceedings of the 4th International Physical Internet Conference. vol. 6. 2017. (Year: 2017).*

*Primary Examiner* — Emmett K. Walsh

(74) *Attorney, Agent, or Firm* — Knobbe, Martens, Olson & Bear, LLP

(57) ABSTRACT

Systems and methods of delivering an item to a mobile delivery receptacle are disclosed. A method of delivering an item to a mobile delivery receptacle can include receiving from a mobile delivery receptacle a location of the mobile delivery receptacle. Based on a cross-referencing credential, the method can include verifying the location of the mobile delivery receptacle. The method may include identifying a mobile delivery unit and determining a position of the mobile delivery unit. The method can include calculating a delivery route from the position of the mobile delivery unit to the mobile delivery receptacle and passing the location of the delivery resource and the delivery route to the mobile delivery unit.

18 Claims, 9 Drawing Sheets

(56) References Cited

U.S. PATENT DOCUMENTS

| | | |
|---|---|---|
| 2016/0189098 A1* | 6/2016 | Beaurepaire ........ H04W 12/084 |
| | | 705/337 |
| 2016/0364989 A1 | 12/2016 | Speasl et al. |
| 2017/0023949 A1 | 1/2017 | Fisher et al. |
| 2017/0073085 A1 | 3/2017 | Tremblay et al. |
| 2017/0091710 A1* | 3/2017 | Van Dyke .............. A47G 29/14 |
| 2017/0228692 A1 | 8/2017 | Pargoe |
| 2017/0305575 A1 | 10/2017 | Bash et al. |
| 2018/0075688 A1* | 3/2018 | Liu ...................... G06Q 10/083 |
| 2018/0121872 A1* | 5/2018 | Walsh ............. G06Q 10/08355 |
| 2019/0283536 A1* | 9/2019 | Suzuki ................. B60H 1/3232 |
| 2019/0311327 A1* | 10/2019 | Habbaba ............... H04W 12/06 |

* cited by examiner

MOVABLE ITEM RECEPTACLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claim the benefit of priority to U.S. Provisional Application No. 62/896,789, filed Sep. 6, 2019, the entire contents of which are hereby incorporated by reference.

BACKGROUND

This disclosure relates to the field of transportable or otherwise movable delivery receptacles. The present application relates to receptacles including moveable receptacles.

SUMMARY

In one aspect described herein, a mobile delivery receptacle comprises a housing having an internal volume configured to store an item therein; a mount coupled to the housing, the mount configured to attach the housing to a mobile object; a computer readable code located thereon, the computer readable code comprising unique identifier information; a sensor coupled to the housing, the sensor configured to communicate the unique identifier information to a delivery resource; and a locking mechanism configured to prevent unauthorized access into the interior of the housing.

In some embodiments, the sensor comprises a passive sensor configured to reflect a signal in response to an interrogation signal from the delivery resource.

In some embodiments, the sensor comprises an active sensor configured to broadcast the unique identifier information to the delivery resource.

In some embodiments, the active sensor is further configured to receive a confirmation signal from the delivery resource, and to unlock the locking mechanism in response to the confirmation signal.

In some embodiments, the mobile delivery receptacle further comprises a processor in communication with the sensor, wherein the processor is configured to connect to a vehicle via a wireless short range communication protocol.

In some embodiments, the processor is further configured to communicate information indicative of the connection with the vehicle to the delivery resource.

In another aspect described herein, a method of delivering an item to a mobile delivery receptacle, the method comprises receiving, in a processor, a request to update the location of a mobile delivery receptacle; receiving, from the user, user credentials; identifying a unique identifier for a mobile delivery receptacle associated with the user credentials; receiving, from the user, information indicative of a location of the mobile delivery receptacle; generating, in a processor, routing instructions for delivering an item to the mobile delivery receptacle based on the received location information; and dispatching a delivery resource to the mobile delivery device according to the routing instructions.

In some embodiments, the method further comprises receiving, from the user, the unique identifier for the mobile delivery receptacle.

In some embodiments, the method further comprises confirming, in a processor, based on receiving the unique identifier from the user, the user's request to update the location of the mobile delivery receptacle.

In some embodiments, receiving, from the user, the unique identifier comprises receiving an image of the unique identifier located on the mobile delivery receptacle.

In some embodiments, receiving, from the user, the unique identifier comprises receiving information indicative of scanning the unique identifier located on the mobile delivery receptacle.

In some embodiments, the method further comprises identifying delivery resource to deliver the item to the mobile computing device based on the location information; determining a delivery route from the location of the delivery resource to the location of the mobile delivery receptacle; and sending the delivery route to the identified delivery resource.

In some embodiments, the request to update the location of the mobile delivery receptacle is received from a user's mobile computing device.

In some embodiments, the information indicative of the location of the mobile computing device is received from a location circuit of the user's mobile computing device.

In some embodiments, the information indicative of the location of the mobile delivery device corresponds with a current location of the mobile delivery device.

In some embodiments, the information indicative of the location of the mobile delivery device corresponds to a future location of the mobile delivery device.

In another aspect described herein, a system for delivering an item comprises: a memory storing: a plurality of unique identifiers for mobile delivery receptacles; associations between the plurality of unique identifiers and a plurality of user credentials; and location information for the mobile delivery receptacles; a user interface configured to receive, from a user: a request to update the location of a mobile delivery receptacle; the user's user credentials; and information indicative of a location of the user's mobile delivery receptacle a processor configured to: query the memory to determine a unique identifier for associated with the received user credentials; update, in the memory, the location of the mobile delivery receptacle associated with the received user credentials; generate routing instructions for delivering an item to the mobile delivery receptacle based on the updated location information; and dispatch a delivery resource to deliver the item to the mobile delivery device according to the routing instructions.

In some embodiments, the user interface is further configured to receive, from the user, the unique identifier for the mobile delivery receptacle.

In some embodiments, the user interface is further configured to receive, from the user, an image of the unique identifier located on the mobile delivery receptacle.

In some embodiments, the user interface is provided on a user's mobile computing device, wherein the request to update the location of the mobile delivery receptacle is received from the user's mobile computing device, and wherein the information indicative of the location of the mobile computing device is received from a location circuit of the user's mobile computing device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1A:
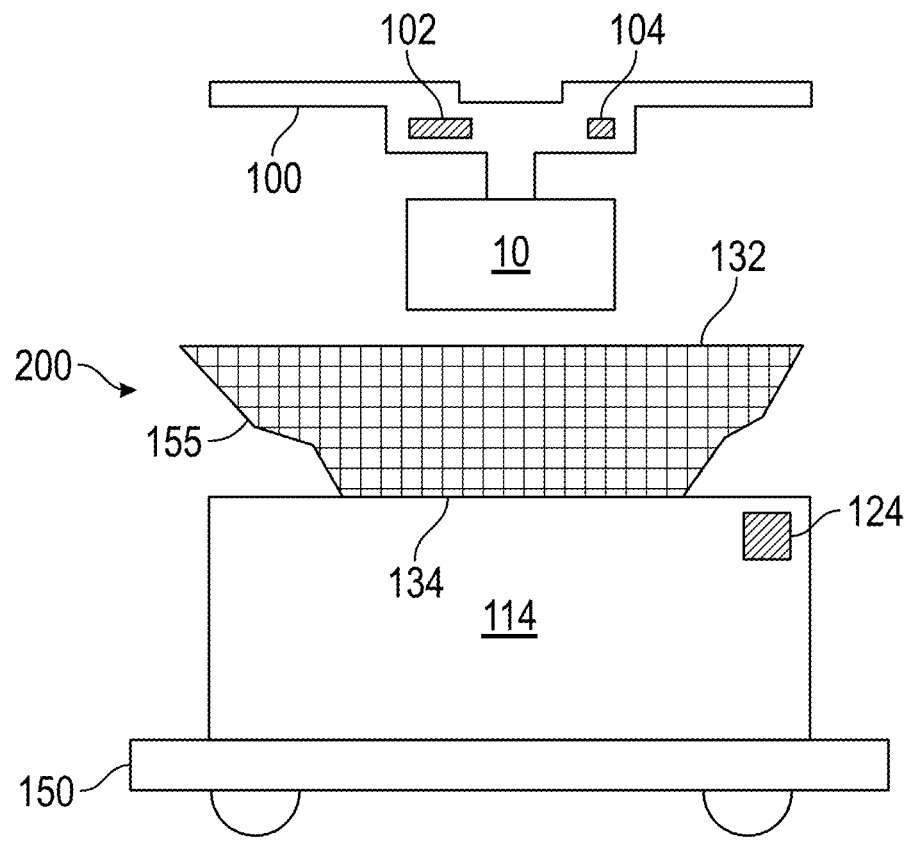
FIG. 1A depicts an example embodiment of a mobile delivery receptacle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Some embodiments herein relate to delivery of items using mobile and/or autonomous delivery receptacles for use, for example, with mobile and/or autonomous delivery units (e.g., vehicles). Some embodiments described herein include delivery infrastructure designed for automated delivery. Some embodiments herein relate to delivery by autonomous delivery vehicles including aerial drones, driving drones, and other automated vehicles. Some embodiments herein relate to receptacles associate with single-family residences, multi-family residences, and/or other locations configured to receive delivery of an item, including commercial buildings and government buildings (e.g., schools, post offices, etc.).

Items are currently delivered by various distribution entities who deliver to receptacles, such as mailboxes, doorsteps, individualized boxes, and the like. In the case of the United States Postal Service (USPS), a delivery vehicle often delivers to multiple addresses within a geographic area. A delivery vehicle may be assigned to a route, which generally includes a particular set of delivery points, such as addresses of businesses, residences, and the like. However, an item recipient may wish to have an item delivered to a location other than the recipient's residence. For example, a recipient may be away from home or from a particular location, and may desire an item be delivered to the location where the recipient is located. An item recipient may have a mobile delivery receptacle. For example, delivery receptacles may be disposed on other autonomous vehicles (e.g., drones), on manned vehicles (e.g., cars, airplanes, buses, ships, etc.), on unmanned vehicles (e.g., carts, wagons, bicycles, etc.), or in any other desired location. A recipient may request that the distribution network deliver an item to a location other than a standard location such as at a house, a mailbox, or on a doorstep. A recipient may desire to have an item delivered to a receptacle in a backyard, near a car, at an office, or some other location convenient for the recipient. In some embodiments, the items may be delivered to a moveable receptacle via a human resource, such as a carrier.

A moveable item receptacle can be utilized by a recipient. The moveable item receptacle can have a unique identifier or similar indicator associated therewith. The distribution network, item sender, or distributor can register an item receptacle using a unique identifier, and can associate the receptacle with a recipient. In some embodiments, the unique identifier is on the receptacle when the receptacle is purchased. In some embodiments, the distribution network can assign an identifier to the recipient, or can associate the unique identifier with the recipient. In some embodiments, the distribution network can sell, provide, or receive the unique identifier or similar indicator from a recipient. The recipient can register the moveable receptacle with the distribution network using, for example the unique identifier. The recipient can, using a mobile computing device and a mobile application, transmit or send the location of the moveable receptacle to the distribution network. This can occur, for example, by scanning a code or identifier on the moveable receptacle with a GPS-enabled mobile computing device. The distribution network can access the registration information to associate a recipient, and the normal or regular delivery point of the delivery point with the received location of the moveable receptacle. When the distribution network has an item to be delivered to the recipient, as indicated by the delivery point listed on the item, the distribution network can identify the location of the movable receptacle associated with the recipient, and can route the item for delivery to the moveable receptacle, rather than to the normal delivery point.

In some embodiments, the item can be delivered via an autonomous delivery vehicle. Autonomous delivery vehicles may be controlled by a carrier, such as a human being, or may be driverless. The autonomous delivery vehicle may need to recognize the mobile receptacle and stop at each one to deliver the item(s) intended for delivery to each one. The infrastructure at each such delivery point may include a mobile delivery receptacle. The mobile delivery receptacle may provide information related to the delivery point. The mobile delivery receptacle may provide security for the item until each item is retrieved by the owner of the item.

For example, the mobile delivery receptacle may include infrastructure, such as a receiving device and/or locking device configured for accepting an item delivered by a delivery resource. A delivery resource can be, for example, a carrier, such as a mail carrier, a delivery vehicle, a mobile computing device, a drone, an automated delivery device, a server of the distribution network, and the like. The infrastructure may be initially closed and may be opened upon proximity of the autonomous delivery vehicle. At each stop, the delivery resource, such as a mobile delivery device, a delivery vehicle, and/or a drone and the mobile delivery receptacle communicate regarding the delivery of the item. The infrastructure may provide a secure location for the storage of the item until the item is retrieved by the owner of the item. The infrastructure may include a lock, latch, keypad, or other user input device to open the infrastructure to allow retrieval of the item. The infrastructure may be located at any designated location associated with the delivery point including a doorstep, porch, mailbox, or mailroom. The devices and methods described herein can increase efficiency of delivering and storing items at each mobile delivery receptacle.

Again, using the USPS as an example, the delivery resource can be directed toward the location of the mobile delivery receptacle. The delivery resource can communicate with the mobile delivery receptacle to change the configuration of the infrastructure associated with the mobile delivery receptacle, for instance, by opening a delivery inlet such as a door or a port into the infrastructure or reconfiguring the infrastructure to provide an empty storage receptacle. The delivery resource can deliver the item to the infrastructure. After delivery, the mobile delivery receptacle can change the configuration of the infrastructure associated with the mobile delivery receptacle, for instance, by closing the delivery inlet such as the door or the port into the infrastructure or by moving the item within the infrastructure. The delivery resource can deliver another item to the mobile delivery receptacle, such as another item to the same owner or another item to a different owner associated with the same mobile delivery receptacle. The mobile delivery receptacle can store one or more items until the owner of the item retrieves the item. The owner of the item can retrieve the item by a user interface such as a lock, keypad, key or other device which can verify identity of the owner of the item. The delivery resource may travel to another mobile delivery receptacle to deliver another item.

The mobile delivery receptacle may be manually operated, fully autonomous, or semi-autonomous. The mobile delivery receptacle can receive an input from a delivery resource, such as a carrier or an autonomous delivery vehicle in order to allow the delivery resource to interact with the mobile delivery receptacle. In the case of an autonomous delivery vehicle, the mobile delivery receptacle can receive an input related to proximity of the autonomous delivery vehicle. In some embodiments, the mobile delivery receptacle may require no human interaction in order to accept an item within the infrastructure, store an item within the infrastructure, or move an item within the infrastructure. The mobile delivery receptacle may require no human interaction to open the infrastructure in order to allow delivery of the item to the owner of the item. The terms autonomous and semi-autonomous can be used interchangeably throughout this disclosure. Also as used herein, the term item can refer to mailpieces, envelopes, flats, packages, parcels, or any other deliverable object or commodity.

In some examples, the mobile delivery receptacle may communicate with a remote computer. For example, the mobile delivery receptacle may need to verify an identity of an approaching delivery resource before the mobile delivery receptacle will open a delivery receptacle, such as those described herein. The mobile delivery receptacle may need to fulfill a set of protocols before a delivery item can be received. As noted, an identify of a delivery person/vehicle may need to be verified (e.g., based on a proxy sensor and/or RF tag, as described herein). Additionally or alternatively, the system may need to verify that the contents of the delivery item can be properly accepted by the corresponding mobile delivery receptacle. For example, a dangerous (e.g., explosive, poisonous, sharp, reactive, corrosive, etc.) item may in some circumstances and/or for certain mobile delivery receptacles be forbidden. Thus, even a detection of an authorized carrier and/or of a proper proximity may not be enough to open the mobile delivery receptacle. The mobile delivery receptacle may rely on one or more sensors, such as those described below, to determine the contents of a delivery item. The delivery resource may be verified (e.g., cross-referenced) by the mobile delivery receptacle (e.g., by the proxy sensor) by whether the delivery resource has previously delivered an item to the mobile delivery receptacle, by whether the delivery resource has previously been detected, and/or by whether a signal has been received from a remote computer verifying the credentials of the autonomous delivery vehicle. In some embodiments, the verification is based on whether a position of the delivery resource can be triangulated from a separate source (e.g., by a cell tower, from a MAC address of the autonomous delivery vehicle).

The mobile delivery receptacle can be in communication with a remote server or network in order to provide registration information and/or location information. The location information can include the current location of the mobile delivery receptacle. As noted above, the distribution network can operate a server or network configured to interface with the mobile delivery receptacle directly, or indirectly, such as via a mobile application, to provide location information to the distribution network.

In some embodiments, the remote computer may pass instructions to the mobile delivery receptacle and/or to the autonomous delivery vehicle for how the delivery resource can reach the mobile delivery receptacle and/or how the package should be properly delivered. For example, step-by-step guidance may be transmitted on how to navigate to the mobile delivery receptacle.

In some examples, the mobile delivery receptacle will only accept objects based on a threshold distance from another object (e.g., a home, apartment building, etc.). For example, a high value or expensive item may only be delivered to a mobile delivery receptacle that is within a certain distance of the recipient's place of residence or place of work, etc. The threshold distance may be about 1 foot, about 5 feet, about 10 feet, about 20 feet, about 50 feet, about 100 feet, about 1000 feet, about 5000 feet, any distance therebetween, or the distance may fall within a range having endpoints as any of those numbers. In some embodiments, the high value item will only be delivered to certain types of mobile delivery receptacles, for example, ones that have intrusion protection, locking devices, or can be otherwise secured or provide only limited access. In some embodiments, the mobile delivery receptacle can determine its own position (e.g., using GPS), which may include a latitude-longitude coordinate. Based on its position, and/or communication from a delivery resource, the mobile delivery receptacle can be configured to open to receive the delivered package (e.g., from the autonomous delivery vehicle) and/or allow the package to be accessed by the recipient.

FIG. 1A depicts an exemplary system for delivery of an item to a moveable item receptacle. The system includes a delivery resource 100 (depicted here as an autonomous delivery vehicle) and a mobile delivery receptacle 200.

Although depicted as an autonomous delivery vehicle, the systems, structures, components, and methods described herein can apply to other types of delivery resources without departing from the scope of the present disclosure. The delivery resource 100 carries an item 10 intended for delivery to the mobile delivery receptacle 200. The delivery resource 100 can deliver one or more items. In some embodiments, the delivery resource 100 can comprise a central computer 102. The central computer 102 may communicate with a remote computer (such as the remote computer 310 of FIG. 1B). The delivery resource 100 can comprise one or more sensors and detectors in communication with the central computer 102. The central computer 102 can be in wireless communication with a network. The communication can be a cellular, 3G, 4G, 5G, LTE, Wi-Fi, or any other desired communication type or format. The central computer 102 can control one or more of the functions of the delivery resource 100, including steering, acceleration, braking, signaling, and the like, using input and feedback from the one or more sensors.

The delivery resource 100 comprises a location sensor 104. The location sensor 104 can be in communication with the central computer 102. The location sensor 104 can be a global positioning system (GPS), or other spatial location system, including GLONASS, a multilateration system, LORAN, triangulation, and the like. The delivery resource 100 can comprise one or more additional sensors in communication with the central computer 102. The one or more additional sensors can track how far the delivery resource 100 has traveled according to movement, for example, of the delivery resource's axels, motors, wheels, and the like. The one or more additional sensors can observe road conditions, monitor the vehicle's surroundings, and read traffic signals, such as signs and lights. The one or more additional sensors can be a stereo camera configured to determine distances, triangulate position, and interpret depth and distance of objects within the field of view. The one or more additional sensors can be ultrasonic sensors, radar sensors, or LiDAR sensors in communication with the central computer 102. The ultrasonic radar, and/or LiDAR sensors can be used to detect how far the delivery resource 100 is from an object, to monitor the surroundings, such as the road, lane lines, other vehicles, pedestrians, and the like. The one or more additional sensors may be disposed on the mobile delivery receptacle 200 (e.g., on the device housing 114) or on an exterior thereof. In some configurations, an optical source can be located on the delivery resource 100, which may send an optical signal to the mobile delivery receptacle 200. The mobile delivery receptacle 200 can read the signal from the optical source via a proximity sensor or proxy sensor 124. In some embodiments, the optical source emits a particular frequency range of invisible light (e.g., infrared light, microwave, etc.) that can be detected by the proxy sensor 124. Other ranges of light are possible.

The delivery resource 100 can comprise a target sensor, which can identify a location of the mobile delivery receptacle 200. The target sensor can identify targets on the mobile delivery receptacle such as the proxy sensor 124. The target sensor can be a radar detector, RF detector, and the like, and can be one of the additional sensors described above. In some embodiments, the target sensor can advantageously use a LIDAR system to identify the locations of the mobile delivery receptacle 200. The target sensor can also be configured to interrogate the mobile delivery receptacle. The target sensor can also be configured to interrogate a sensor on the mobile delivery receptacle such as the proxy sensor 124. The target sensor can also be configured to read a response provided by a component of the mobile delivery receptacle. For example, the mobile delivery receptacle 200 may have a proxy sensor such as an RF tag thereon, the RF tag storing specific instructions. The target sensor can activate the tag, in the case of a passive proxy sensor, read the emitted signal from the RF tag, and transmit the information from the emitted signal to the central computer 102. In the case of an active sensor, the central computer 102 can communicate with the proxy sensor 124 to exchange information, for example, to identify the mobile delivery receptacle, a recipient, etc.

The delivery resource 100 depicted in FIG. 1A and the relative placement of components is exemplary only. In some embodiments, the delivery resource 100 is a delivery vehicle, such as a truck, a van, a cart, or any other desired type of vehicle. In some embodiments, the delivery resource 100 is an aerial drone. In some embodiments, the delivery resource 100 is driving drone, such as a car or other vehicle. In some embodiments, the delivery resource 100 is a manually controlled vehicle or a mobile delivery device carried by a carrier.

The mobile delivery receptacle 200 comprises an object 150. The object 150 can be any object, device, vehicle, landscape feature, building, etc., to which a recipient or user of the mobile delivery receptacle 200 may wish to attach the mobile delivery receptacle 200, or on which a user may wish place the mobile delivery receptacle 200. For example, in some embodiments, the object 150 can be a car, such as the trunk of a car, a balcony, an area of a workplace, a roof of an apartment building, a sidewalk, or any other desired object or location.

The mobile delivery receptacle 200 includes a device housing 114 which can be disposed on or may be otherwise coupled to the mobile object 150 via a variety of attachment mechanisms. The device housing 114 can include a mounting feature. The mount may be used to couple (e.g., adhere, attach, stick, etc.) the device housing 114 to the mobile object 150. The mount may allow for removable coupling of the device housing 114 to the mobile object 150. For example, the mount may include one or more magnets, which can be used to attach the device housing 114 to a metal vehicle. In some embodiments, the mounting feature can include a lock mechanism so the device housing 114 can be securely attached to the object 150. This can include a mounting bracket which can be securely connected to a car, an office building, etc., at a place where a recipient is often located. The device housing 114 can include a complementary bracket or mounting hardware to securely attach the device housing 114 to the mounting bracket, and the device housing 114 can be locked in place.

The device housing 114 comprises a container which at least partially surrounds an internal volume. The internal volume is adapted to receive the item, and to contain the item until the recipient retrieves the item from the internal volume. The device housing 114 can include a door or access portion which allows and/or prevents access to the internal volume of the device housing 114, as the recipient desires. The door can be activated manually, electronically, remotely, etc., as is described herein.

The mobile delivery receptacle comprises a receiving device 155 connected to the device housing 114, and adapted to guide the item into the door of the device housing 114, where the item can be securely contained within the internal volume. The receiving device 155 can have one or more of a number of configurations. For example, as shown in FIG. 1A, the receiving device 155 is a capture device configured to increase the area for receiving an item 10 into the device housing. As shown, the receiving device 155 includes a net having an open first end 132 into which the item 10 is received, and a second end 134 connected to the device housing 114 around the door of the device housing. The receiving device 155 operates to move an item from the open first end 132 to the second end 134 of the receiving device 155, and guides the item 10 through the door of the device housing 114 and into the internal volume.

In some embodiments, other capture devices may be used, such as a basket, clasp, grip, bucket, barrel, or any other desired form, such as those described herein.

In some embodiments, the receiving device 155 can include a platform that opens inward under the weight of a delivery item 10. In some embodiments, the receiving device 155 is designed to open under the weight of 1 pound, but other configurations are contemplated (e.g., 4 ounces, 6 ounces, 8 ounces, 10 ounces, 12 ounces, 14 ounces, 16 ounces, 18 ounces, 20 ounces, 22 ounces, 24 ounces, 26 ounces, 28 ounces, 30 ounces, 32 ounces, etc.). For instance, the weight of the item, acting under the influence of gravity can cause the receiving device 155 or a portion thereof to pivot inward. For example, the receiving device 155 may include a plurality (e.g., two) portions that pivot and/or rotate under the weight of the item. In some embodiments, the receiving device 155 includes a spring loaded hinge such that when an item of sufficient weight is placed on the receiving device 155, the receiving device 155 is forced to spring downward about the hinge creating an open platform door. Other configurations are contemplated.

In some embodiments, the receiving device 155 can comprise or include the door of the device housing, and can be manually, electrically, or mechanically opened when a delivery resource is present to deliver the item, as will be described in greater detail below.

The device housing 114 can be designed to accept one or more items at a time. The mobile delivery receptacle 200 can include one or more features to facilitate delivery of an item to the owner of the item. The mobile delivery receptacle 200 can include a latch (not shown) or lock. The latch or lock can be accessible by a physical or electronic key to open the mobile delivery receptacle 200. In some embodiments, the latch is coupled to a door (not shown) coupled to the mobile delivery receptacle 200 by a hinge (not shown). The key allows an owner of the items to retrieve the items. In some embodiments, the latch or lock can be operated remotely via a mobile computing device, via a code input on an input device, such as a keypad or touch screen, or other similar device.

In some embodiments, the device housing 114 of the mobile delivery receptacle 200 cannot be accessed without proper credentials. For example, the additional sensors (described above) may be calibrated to determine whether a user attempting to open the device housing 114 is authorized to do so. The credentials may include a pairing (e.g., electronic handshake, a Bluetooth pairing, etc.), a passcode (e.g., password, secret questions, two-step authorization, etc.). Because the mobile delivery receptacle 200 is by its nature mobile and can be transported, it may be helpful to take additional steps to verify an identity of a would-be entrant. In some embodiments, the access is only given to a person based on the contents of the item that has been delivered. For example, certain access may only be granted based on a showing of particular credentials (e.g., meeting a particular level of assurance (LOA) clearance).

The mobile delivery receptacle 200 can include one or more proxy sensors 124 to create a virtual handshake with the delivery resource 100 (e.g., via the location sensor 104, the central computer 102, or additional sensor). The proxy sensors 124 can identify a location of the delivery resource 100. When the proxy sensors 124 identify the location of the delivery resource 100, the proxy sensors can transmit a test signal to the delivery resource 100, for example, by emitting a signal to or reflecting a signal from the delivery resource 100. The test signal can test whether the delivery resource 100 is the authorized delivery vehicle of the item 10. The proxy sensors 124 can receive a response signal from the delivery resource 100. In some embodiments, the proxy sensors 124 can confirm the accuracy of the response signal via a confirmatory transmission to a remote computer (e.g., the remote computer 330 of FIG. 1B). The remote computer can confirm that the delivery resource 100 is within a threshold proximity to the mobile delivery receptacle 200 and/or that the delivery resource 100 is authorized to deliver the item 10. The proxy sensors 124 can transmit and/or receive any signal for communicating with the delivery resource 100 and/or the remote computer. For example, the proxy sensors 124 can be configured to detect optical signals, such as infrared, radio (e.g., Bluetooth), microwave, visible, ultraviolet, etc. In some embodiments, acoustic signals may be used, such as ultrasonic signals.

The proxy sensors 124 can communicate with the delivery resource 100 and/or with the remote computer via a virtual handshake. As used herein, a virtual handshake can include a wireless pairing or transfer of information between two components. For example, a virtual handshake can include communication between the autonomous delivery vehicle 100 and the mobile delivery receptacle 200. The autonomous delivery vehicle 100 can recognize the mobile delivery receptacle 200, or a receptacle identifier stored in a passive or active sensor, as described elsewhere herein. The autonomous delivery vehicle 100 can confirm that the mobile delivery receptacle 200 is associated with the distribution network, such as USPS, prior to delivering an item 10 to the mobile delivery receptacle 200. In some embodiments, the mobile delivery receptacle 200 can also confirm the identity of the autonomous delivery vehicle 100 prior to opening, unlocking, or allowing access to an internal compartment (e.g., of the receptacle housing 114) to receive an item from the autonomous delivery vehicle 100. In some embodiments, the mobile delivery receptacle 200 includes a display interface configured to allow a user to enter information (e.g., a passcode). In some embodiments, the mobile delivery receptacle 200 includes a fingerprint identification unit (e.g., in a display interface) for allowing a user to verity his or her identity.

The mobile delivery receptacle 200 can store information identifying the location of the device housing 114, the mobile object 150, and/or the receiving device 155 such as conveying coordinate information including, but not limited to, GPS coordinates, and can broadcast this information for reception by the autonomous delivery vehicle 100. This information can be identified and/or stored in the proxy sensor 124.

Figure 1B:
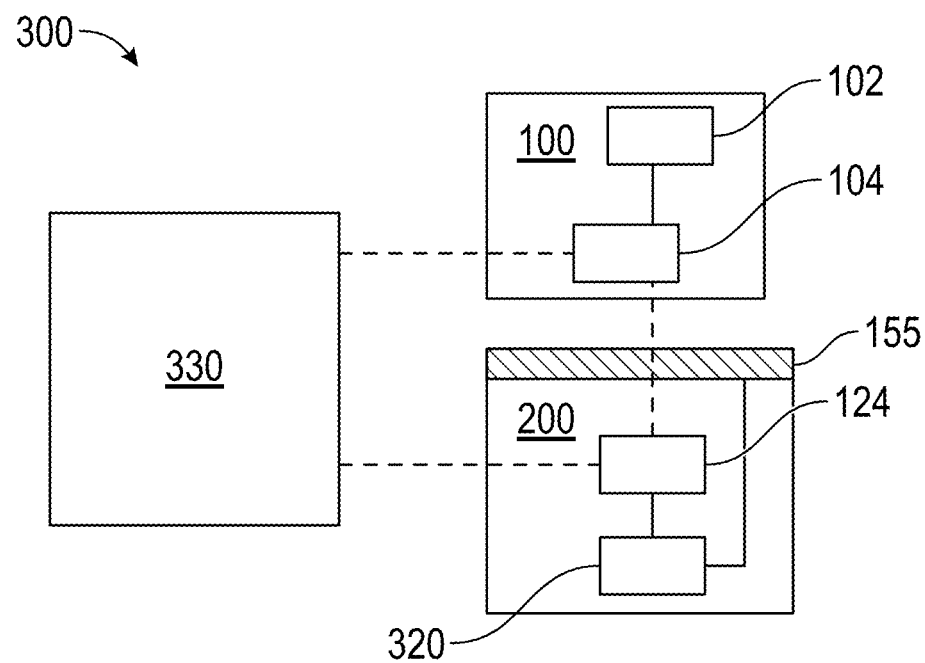
FIG. 1B is a block diagram showing an example mobile deposit system, according to one embodiment.

FIG. 1B shows an example mobile deposit system 300, according to one embodiment. The mobile deposit system 300 can include a remote computer 330 that is in communication with a delivery resource 100 and a mobile delivery receptacle 200, such as those described herein. The delivery resource 100 can include a resource controller 102 that is in communication with the location sensor 104 of the delivery resource 100. The mobile delivery receptacle 200 can include a receptacle controller 320 that is in communication with a proximity sensor 124 of the mobile delivery receptacle 200. The receptacle controller 320 may also be in communication with a 132 of the mobile delivery receptacle 200. The location sensor 104 can include an optical source, such as one described above with respect to FIG. 1A.

The remote computer 330 may communicate with the location sensor 104 and/or the proximity sensor 124 remotely (e.g., wirelessly), as indicated by the broken lines. The location sensor 104 may communicate with the central computer 102 via a direct connection (e.g., wired connection), as indicated by the solid line. Additionally or alternatively, the receptacle controller 320 may be in a direct connection with the proximity sensor 124 and/or the receiving device 155, as shown. The delivery resource 100, such as via the location sensor 104, may communicate with (e.g., identify a location of, track, etc.) the mobile delivery receptacle 200, via the proximity sensor 124.

Using the location sensor 104, the delivery resource 100 may identify a location of the mobile delivery receptacle 200, as described herein. The central computer 102 can receive the indication from the location sensor 104 that the mobile delivery receptacle 200 is within a threshold proximity. In response to the indication, the central computer 102 can direct a path (e.g., flight path, driving route) of the delivery resource 100 to the mobile delivery receptacle 200. The location sensor 104 can transmit a signal to the remote computer 330 to indicate that the delivery resource 100 is within the threshold proximity. The location sensor 104 can receive an identification credential (e.g., ID code, RF ID, etc.) of the mobile delivery receptacle 200 from the proximity sensor 124. The location sensor 104 can then transmit the received identification credential to the remote computer 330. The remote computer 330 can confirm the identity of the mobile delivery receptacle 200 and/or confirm that the item 10 is targeted for delivery to the mobile delivery receptacle 200. The remote computer 330 can alternatively or additionally transmit a signal to the proximity sensor 124 of the delivery resource 100 that the delivery resource 100 has an item 10 for delivery to the mobile delivery receptacle 200. Based on the received signal from the remote computer 330, the receptacle controller 320 can cause the receiving device 155 to receive the item 10, such as described herein (e.g., extend a net, open a door, extend a clasp, etc.). Thus, the 300 can work together to cause fully automated delivery of an item 10 to a mobile delivery receptacle 200, in spite of the mobile nature of the mobile delivery receptacle 200.

Figure 1C:
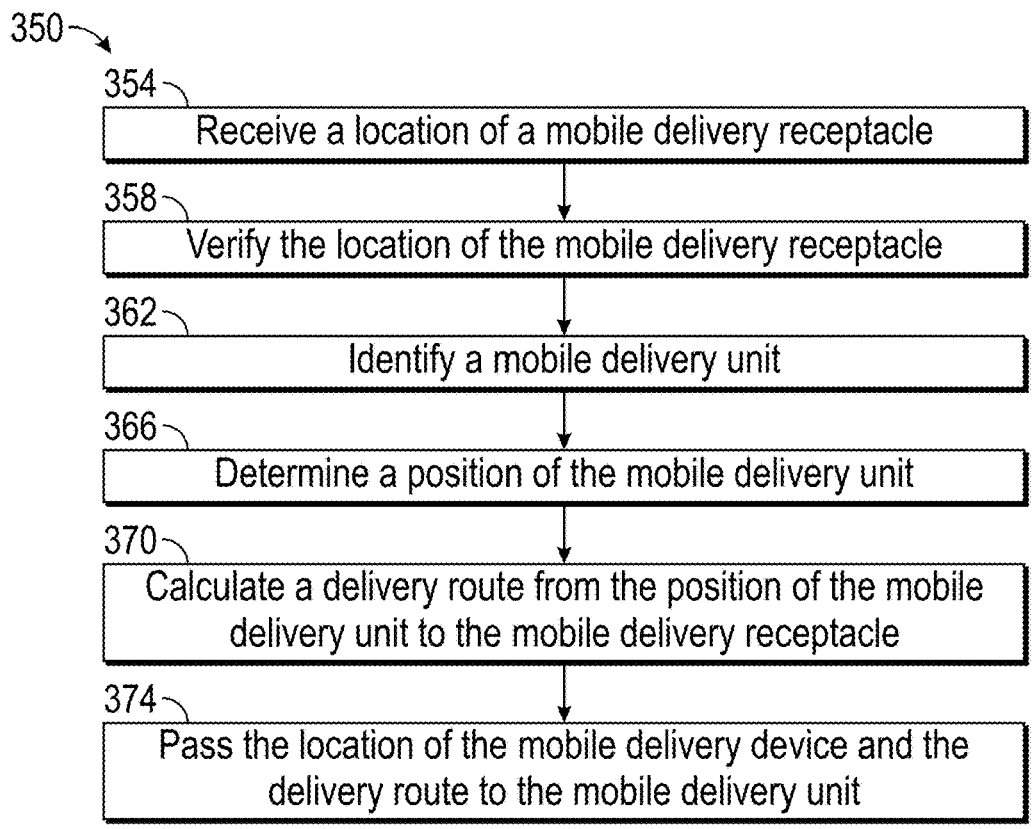
FIG. 1C is flowchart showing an example method of delivering an item to a mobile delivery receptacle.

FIG. 1C shows an example method 350 of delivering an item to a mobile delivery receptacle (e.g., the 200 described above). At block 354, the method 350 may include receiving from a mobile delivery receptacle 200 a location of the mobile delivery receptacle 200. For example, the location may be passed from a sensor (e.g., the proximity sensors 124) of the mobile delivery receptacle 200 via a wireless communication channel to the remote computer 330. In some embodiments, the location can be passed by a mobile computing device, such as a smartphone or tablet computer of a recipient, running an application or website for delivering items. For example, a recipient can place a receptacle 200 in a desired location and can access an application or website for delivering items, and can indicate to the distribution network via the application or website, the location of the mobile delivery receptacle 200, using the location of the recipient's smart phone or tablet, and communicating the location information via the tablet computer or the smart phone's cellular, Wi-Fi, or other network. In some embodiments, the location of the mobile delivery receptacle 200 can be provided to the remote computer 330 via a user's mobile computing device. For example, a user can registered a mobile computing device, such as a smartphone, with the distribution network and an association between the mobile computing device and the mobile delivery receptacle 200. A user can access an application from the distribution network and scan a code or interact via a wireless protocol with the mobile delivery receptacle 200, such as with the proximity sensor 124, or a computer readable code, RFID tag, etc., disposed on the mobile delivery receptacle 200. When the code is scanned or interacted with, the mobile computing device can send its coordinates to the remote computer 330. The sent coordinates can be indicative of the location of the mobile delivery receptacle. Based on the association between the mobile computing device and the mobile delivery receptacle 200 and the associated code, the remote computer can know the location of the mobile delivery receptacle 200, and can direct items for delivery to the user to the location of the mobile delivery receptacle 200.

At block 358, the method 350 can include verifying, based on a cross-referencing credential, the location of the mobile delivery receptacle. The cross-referencing credential may be passed from the mobile delivery receptacle 200 and/or received by one or both of a mobile delivery unit (e.g., the delivery resource 100) and/or a remote computer (e.g., the remote computer 330). The cross-referencing credential can include, for example, querying a memory of the remote computer 330 to determine previously received locations of the mobile delivery receptacle 200. If the mobile delivery receptacle 200 is placed in a location that has been previously used, the system can have a higher level of assurance that the receptacle has been placed by the recipient. If the location has not been used before for the mobile delivery receptacle 200, the remote computer 330 can request additional information, for example, for additional confirmation from the recipient via a smartphone application. The recipient placing the mobile delivery receptacle 200 can then provide additional information, a key or token from a mobile computing device, a biometric confirmation, or the like. If the additional information is recognized by the remote computer 330 and the recipient can be confirmed, the location of the remote delivery device is accepted. In some embodiments, the cross-referencing credential can additionally or alternatively include an approximation of a location based on at least one of a signal from a cell tower or a mac address of the mobile delivery receptacle 200. If the location provided by the recipient via the application or website can be confirmed as corresponding to a known work address, etc., then the cross-reference credential is accepted and the receptacle can be placed.

In some embodiments, because a car can move from place to place, and a recipient may desire to have an item delivered in a location in which the mobile delivery receptacle 200 has not been previously used, the mobile delivery receptacle 200 can be associated with the vehicle. The recipient or owner of the mobile delivery receptacle 200 can pair and/or connect the mobile delivery receptacle with a Bluetooth or other NFC enabled device, such as the vehicle on which the mobile delivery receptacle 200 is to be placed. The recipient or owner of the mobile delivery receptacle can register a car and a Bluetooth connection or pairing, using a MAC address or other feature, with the remote computer 330. The remote computer can confirm that the mobile delivery receptacle is paired with or connected via Bluetooth to a vehicle registered with the recipient or owner of the mobile delivery receptacle 200. When the pairing or connection is confirmed, the distribution network can have a higher assurance that the mobile delivery receptacle 200 is being placed by the registered owner or recipient, and can accept the location of the receptacle. A similar confirmation process can occur when the delivery resource 100 approaches the delivery receptacle, for example, as part of the handshake process. If the delivery resource 100 does not receive indication that the receptacle is connected to or paired with a known vehicle, the delivery resource 100 may not deliver the item to the receptacle.

At block 362, the method 350 can include identifying the mobile delivery unit of delivery resource 100. Identifying the mobile delivery unit may include receiving a verification signal from the remote computer 330.

At block 366, the method 350 can include determining a position of the delivery resource 100. The remote computer 330 can identify the location of a delivery resource able to deliver the item to the received location of the mobile delivery receptacle 200. In some embodiments, this step is performed at the beginning of a day before delivery resources depart a delivery facility with the items. The delivery resource which will pass nearest the location of the mobile delivery receptacle 200 can be selected, and the item to be delivered can be provided to the delivery resource for delivery. In some embodiments, where the delivery resource is a drone, the drone that is closest to the location of the item to be delivered, to the delivery facility, which has sufficient charge, etc., can be selected or identified. In some embodiments, if multiple delivery resources are available to deliver the item, the remote computer 330 can select any of the multiple delivery resources.

At block 370, the method 350 can include calculating, based on the position of the delivery resource 100 and/or of the mobile delivery receptacle 200, a delivery route from the position of the mobile delivery unit 100 to the mobile delivery receptacle 200. At block 374, the method 350 can include passing the location of the delivery resource 100 and the delivery route to the mobile delivery unit. In some embodiments, the method 350 further includes confirming a delivery of the item to the mobile delivery unit. In some embodiments, the method 350 further includes verifying an identity of an individual, such as an identity of a person delivering the item or package. The identity may be verified in any way described herein and may include obtaining and/or verifying a fingerprint, a voice identification, a voice command, a password, a retinal scan, or some other biometric or security feature. The verification may be received via a display interface disposed, for example, on the mobile delivery receptacle.

The method 350 may further include locking the mobile delivery receptacle. In some embodiments, the method 350 includes determining a distance of the delivery resource 100 from a point of interest. The point of interest may be a person's home, a store, a nearest USPS location, a landmark, etc. The point of interest can be stationary or substantially stationary.

The method 350 can include communicating with the remote computer 330, which may include verifying information received from the mobile delivery receptacle. The information received may include location information, identity information (e.g., of an individual, of the mobile delivery unit, etc.), verification information, or the like. The method 350 can further include passing authorization credentials to the mobile delivery unit and/or to the mobile delivery receptacle. Other variations are possible. The information received by and/or passed from the remote computer may be done via a virtual handshake.

When the delivery resource 100 arrives at the location of the mobile delivery receptacle 200, the delivery resource 100 can identify the mobile delivery receptacle using a signal from the mobile delivery receptacle or a connected computing device, as described elsewhere herein, to perform a handshake, to positively identify the mobile delivery device 200 as being associated with the recipient, and to confirm that the item carried by the delivery resource is intended for delivery to the mobile delivery receptacle 200. The delivery resource 100 can confirm with the remote computer, that the detected mobile delivery receptacle 200 is registered with the distribution network and is assigned to or associated with the intended recipient of the item.

Figure 1D:
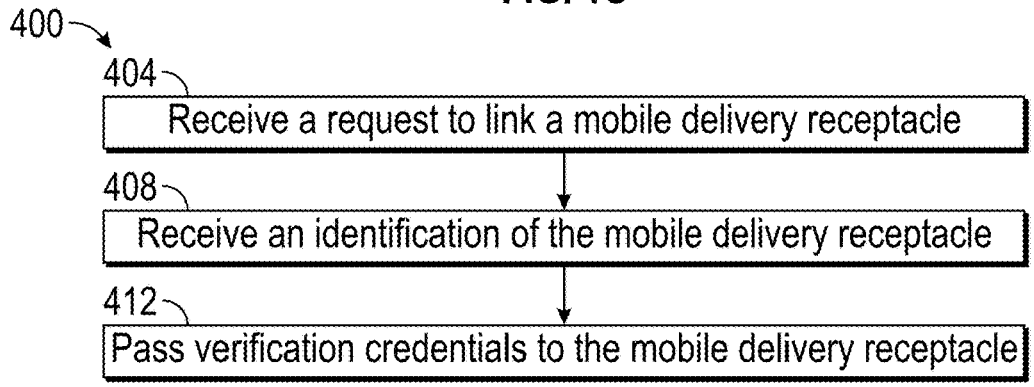
FIG. 1D is a flowchart showing an example method of registering a mailbox or mobile delivery receptacle.

FIG. 1D shows an example method 400 of registering a mailbox or mobile delivery receptacle (e.g., a mobile delivery receptacle 200), for example, with the USPS. At block 404 the system receives a request to from a user to register a mobile delivery receptacle 200 and associate a particular mobile delivery receptacle 200 with the recipient. The system can register and link a mobile delivery receptacle 200 to a user or recipient, such as to a user's mobile computing device, address, name, or account, in order for the user to be able to tell the distribution network the location of the mobile delivery receptacle 200 at any given time. The registration process can occur, for example, via a mobile application running on the user's mobile computing device. A user may wish to register a mobile delivery device 200, for example, when the user purchases or receives the mobile delivery device 200.

At block 408, the method 400 includes receiving an identifier of the mobile delivery receptacle 200. Upon accessing a registration application or website, the recipient can begin a registration process. The application can request login credentials for the user, to confirm the identity of the user with the distribution network. The application can then request an identifier for the mobile delivery device 200. The identifier can include a unique ID for the mobile delivery receptacle 200, such as a unique computer readable code located on the mobile delivery receptacle 200, an RFID tag, or a BLE type identifier, NFC device, etc., on the mobile delivery receptacle 200. The user can, using a mobile computing device, scan the computer readable code, pair with or connect to the BLE or NFC to register the mobile delivery receptacle 200 with the distribution network. The system can also request, obtain, or create a unique identifier for the mobile computing device, such as an electronic serial number, a token stored in the mobile application, or other unique identifier identifying the user's mobile computing device. The user can also provide the system with a preferred location for the mobile delivery receptacle 200, one or more likely locations, BLE information for vehicles, a default location of the mobile delivery receptacle 200, and the like. Each day, or at another periodicity, the distribution network can determine the locations of mobile delivery devices 200. The distribution network can assume the mobile delivery receptacles 200 are at their default location, if the system has not received any alternate locations for the mobile delivery receptacles 200. In some embodiments, the user can provide a number of preferred locations, such as a work location, home location, and the like. The registration can also store recipient names for users or owners of the mobile delivery receptacle 200, and specific information about the mobile delivery receptacle being registered, including, for example, a size of the mobile delivery receptacle 200, a receptacle type (e.g., a net, a clasp, or others described herein), key information, and/or any other information that may identify the mobile delivery receptacle 200 or be used when delivering an item to the mobile delivery receptacle 200. This information be input by the user, or can be contained within or associated with the code on the mobile delivery receptacle 200.

At block 412, the method 400 can include passing verification credentials to the mobile delivery receptacle 200. For example, the verification credentials may include a unique identifier, handshake information, a token, electronic key, etc., that may be used by the mobile delivery receptacle 200 to authorize a delivery resource 100 to deliver to the mobile delivery receptacle 200. This verification credential can act as a key to allow a delivery resource 100 to access the internal volume of the mobile delivery receptacle 200 in order to deliver thereto. This verification credential can be provided by the user, for example, by the distribution network during registration, or can be included in the code scanned by the user. The code can be communicated to the delivery resource, and can be provided to the mobile delivery receptacle 200 when a delivery is attempted. Additionally or alternatively, the verification credentials may be passed to a delivery resource to allow it to cause a receiving device (e.g., the receiving device 155) of the mobile delivery receptacle to go into an open state. Other variants are possible.

Figure 1E:
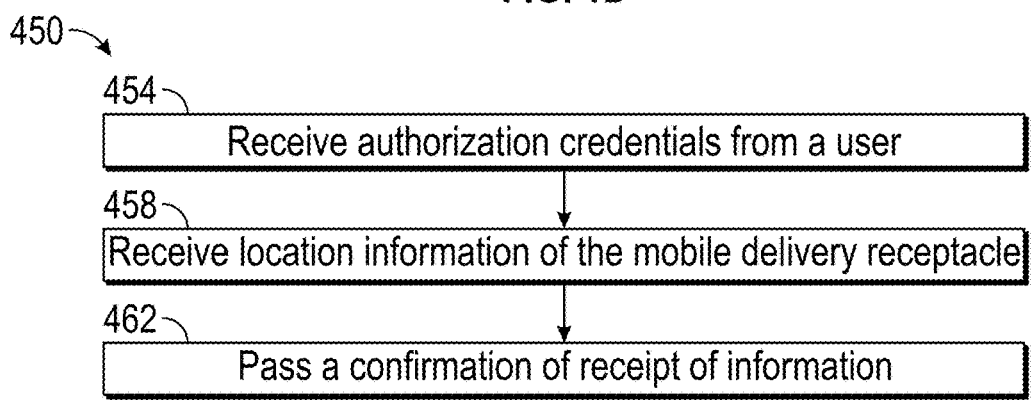
FIG. 1E is a flowchart shows an example method for activating a mobile delivery receptacle when an owner is going to be away or otherwise unreachable.

FIG. 1E shows an example method 450 for activating a mobile delivery receptacle when an owner is going to be away or otherwise unreachable. An owner may wish to activate the mobile delivery receptacle when going on a trip and/or when moving the mobile delivery receptacle. Thus, the owner may be interested in rerouting a delivery of items from a different delivery receptacle (e.g., a stationary mailbox) to a mobile delivery receptacle 200. At block 454, the user accesses the system via an application, website, etc., and the system receives authorization credentials from a user, in the form of a login, receiving a scanned identifier on the mobile delivery receptacle 200 via the user's smartphone, or the like. The authorization credentials can include a password, an ID number, a fingerprint, a voice recognition, or any other credential that identifies proper credentials to reroute delivery of an item to an owner. The method 400 moves to block 458, wherein the system receives location information of the mobile delivery receptacle 200. The location information may include a location of the mobile delivery receptacle at that time and/or at an identified future time. For example, the user may indicate that the mobile delivery receptacle is at a specific location now, and will be there for an identified length of time. In some embodiments, the user may indicate that the mobile delivery receptacle will be at a particular location in the future, for example, when the user is at work and the mobile delivery receptacle 200 goes to work with the user's vehicle. The location information may include a location during a specified time period, which may comprise hours, days, weeks, etc. In some embodiments, the user may provide receiving attachment device information, which can include a type, shape, color, location, etc. of a device to which the mobile delivery receptacle is attached. The location information can be provided as described elsewhere herein, for example, from the mobile computing device 200 itself, from a location circuit of the user's smartphone, from an address selected by the user, etc. The user can also select, from a list of items to be delivered to the recipient, one or more items which the user desires to be delivered to the mobile delivery receptacle 200. For example, if the user is expecting a particular item, the user can request that the particular item be delivered to the mobile delivery receptacle 200 at the desired location, and that other items be delivered to a default location, such as the user's home address or mailbox.

The method 450 moves to step 462, wherein the system provides a confirmation of receipt of the location information at. The confirmation of receipt of information may include confirming any details that were received.

Figure 2:
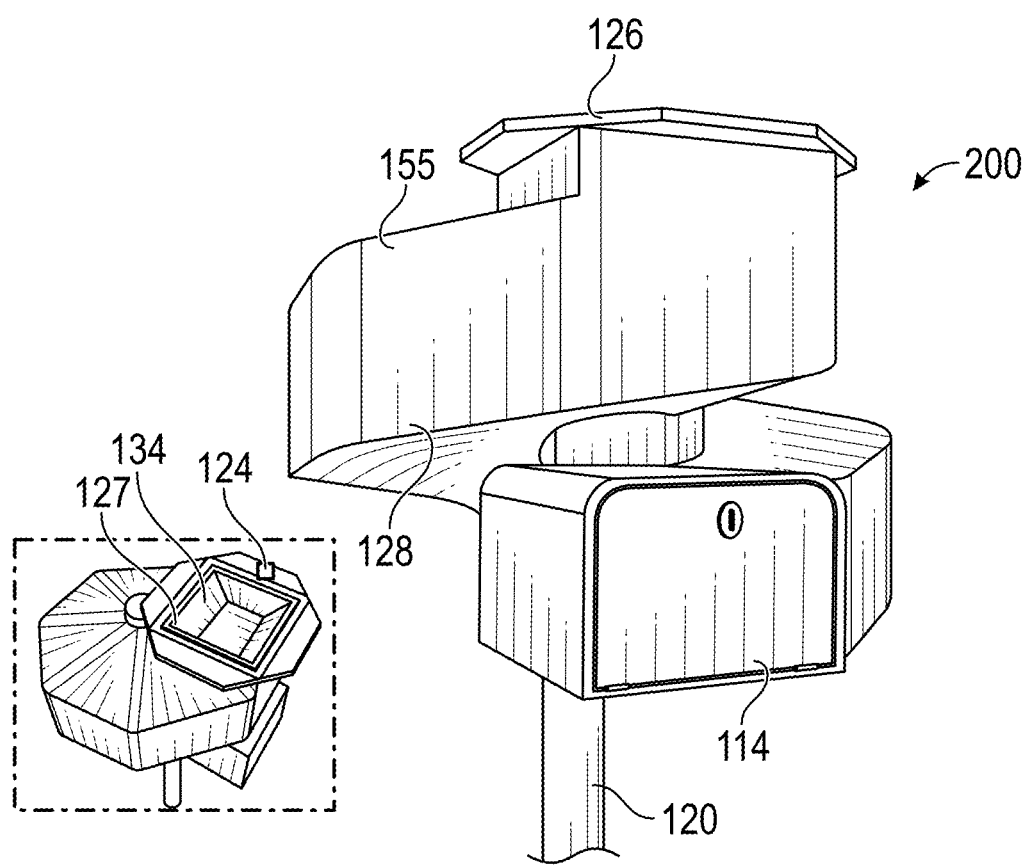
FIG. 2 depicts a perspective view of an example embodiment of a mobile delivery receptacle.

With reference to FIG. 2, the mobile delivery device 200 can have include the receiving device 155 having a slide 128. The slide 128 can be considered a delivery chute. In some embodiments the slide 128 can include rollers to assist the movement of an item down the slide 128. In some embodiments, the slide 128 can include a smooth, low-friction surface to assist items in moving down the slide 128. The item can move down the slide 128 under the influences of gravity. In the illustrated embodiment, the slide 128 is a corkscrew or helical shape. The slide 128 can originate at the mobile object 150 and extend the height of the receiving device 155. The slide 128 can be connected within the body of the receiving device 155 through any fastener or mechanism in the art. In some embodiments, the slide 128 is integrally or monolithically formed with the device housing 114 of the mobile delivery receptacle 200. The slide 128 can end at a door of the mobile delivery receptacle 200. The slide 128 can facilitate the storage of multiple items along the slide 128. As one item is removed from the receiving device 155, one or more additional items may continue to move down the slide 128 under the influence of gravity. The owner can retrieve the one or more additional items from the receiving device 155. Other slide configurations are contemplated.

FIG. 2 depicts a perspective view of an example compact mobile delivery receptacle mobile delivery receptacle 200. In some embodiments, an intermediate structure 113 creates a delivery chute to the device housing 114. The intermediate structure 113 can include a closed and/or locked interior. The device housing 114 can include the post 120 designed to anchor the device housing 114 to a mobile surface such as the mobile object 150.

As shown in FIG. 2, the mobile delivery receptacle 200 can include a platform 126, which may be part of the receiving device 155. The proxy sensor 124 can be embedded in or on the platform 126. The item can be placed on the platform 126 during delivery. The items will be placed on, near, or through the platform 126 (e.g., of the receiving device 155). The platform 126 can include doors 134 that open (e.g., based on weight, as described above, or based on a signal received from the proxy sensor 124).

The mobile delivery receptacle 132 can include the slide 128. The slide 128 can be considered a delivery chute. The item can move down the slide 128 under the influences of gravity. In the illustrated embodiment, the slide 128 is a corkscrew or helical shape. The slide 128 can originate at the mobile object 150. The slide 128 can end at the mobile delivery receptacle 200. The slide 128 can facilitate the storage of multiple items along the slide 128. The slide 128 can allow ensure a slow delivery of items along the slide 128. The slide 128 can reduce damage to items by slowing the travel of items from a first height to a second, lower height. The device housing 114 can be secured such as through a latch and a key, keypad or other device to lock the device housing 114.

Figure 3:
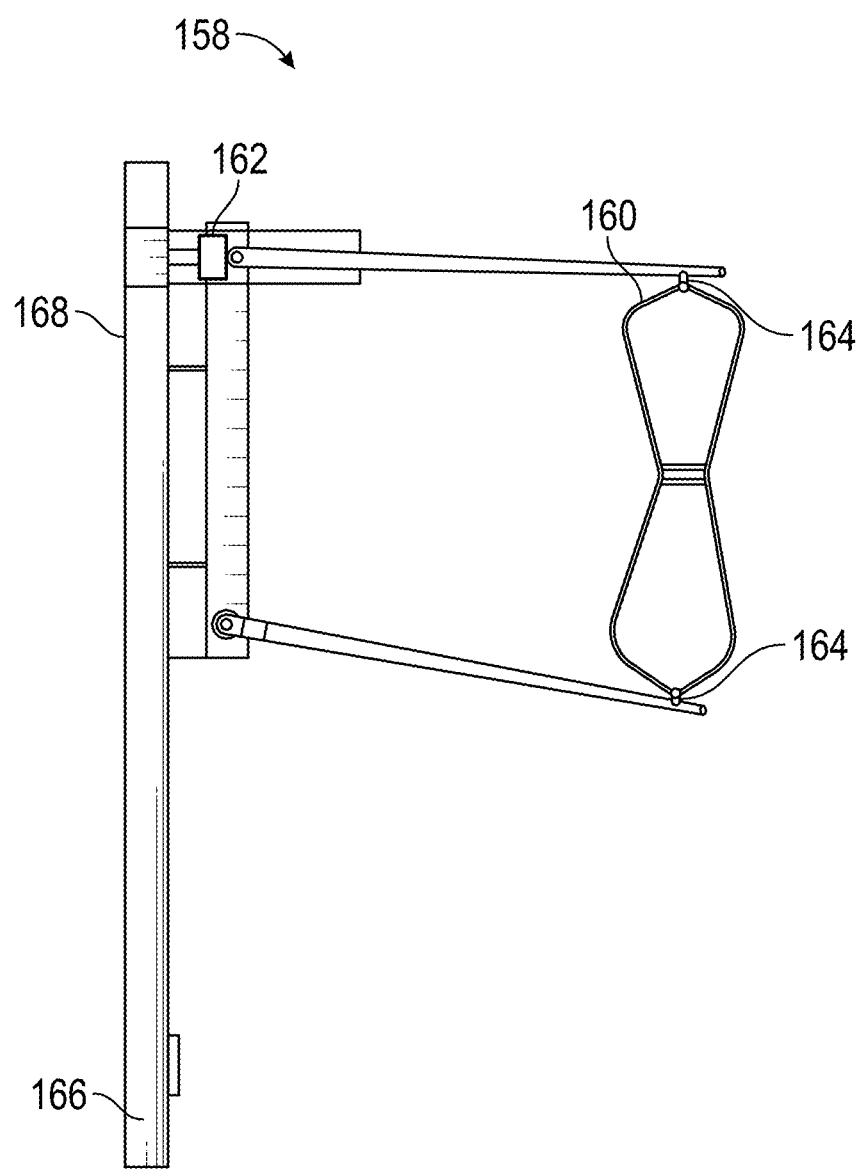
FIG. 3 depicts a side view of an example embodiment of a clamp mobile delivery receptacle.

FIG. 3 depicts a side elevation view of a clamp mobile delivery receptacle 158. The clamp mobile delivery receptacle 158 can accept one or more items at a time. The clamps 164 can secure the item to the clamp mobile delivery receptacle 158. In some configurations, the clamps 164 retain the delivery item 10 until authenticated access has been presented (e.g., a password, an access credential, a proximity of the autonomous delivery vehicle 100, etc.). In some embodiments, the clamps are powered by electromagnets.

FIG. 3 illustrates components of the clamp mobile delivery receptacle 158. In this embodiment, the receptacle does not enclose the item. Rather, the receptacle is a position or surface designed to accept an item. Prior to delivery, the item can include one or more attachment members 160 coupled thereto. The attachment member 160 can be any mechanism that allows the item to be held by the clamp mobile delivery receptacle 158. The clamps 164 can be any extension with a surface designed to accept the item. In the illustrated embodiment, the clamp 164 is configured to couple with the attachment member 160 to receive the item. The clamps 164 can be configured to automatically retract and/or deploy based on a location of the autonomous delivery vehicle 100, such as described herein.

As described herein, the autonomous delivery vehicle 100 can deliver an item. The autonomous delivery vehicle 100 can communicate geospatial data with a proxy sensor 162. The proxy sensor 162 can be located on or in the clamp mobile delivery receptacle 158. The proxy sensor 162 can be a passive proxy sensor. In some embodiments, the proxy sensor 162 can be located on a surface of one or more of the clamps 164. The proxy sensor 162 can communicate with the autonomous delivery vehicle 100, indirectly where the item is to be dropped. The proxy sensor 162 can communicate instructions including how to secure the item to the clamp 164 of the clamp mobile delivery receptacle 158 with the autonomous delivery vehicle 100. After receiving instructions and/or positional information, the autonomous delivery vehicle 100 can deliver the item. The autonomous delivery vehicle 100 can continue on its way, for instance, along the route to another mobile delivery receptacle.

The clamp mobile delivery receptacle 158 can include structures to support the items. The clamp mobile delivery receptacle 158 can include a stake 166. The clamp mobile delivery receptacle 158 is secured to a mobile object (e.g., the mobile object 150) or other structure with the stake 166. The clamp mobile delivery receptacle 158 can include a pole 168. In some embodiments, the pole 168 can telescope to adjust the height of the clamp 164 relative to the mobile object. The adjustable pole 168 can allow for the delivery from several kinds of autonomous delivery vehicle 100, including aerial and ground based autonomous delivery vehicles. The clamp mobile delivery receptacle 158 can allow for exception handling, for instance for items that should not be secured to the clamp 164.

Figure 4A:
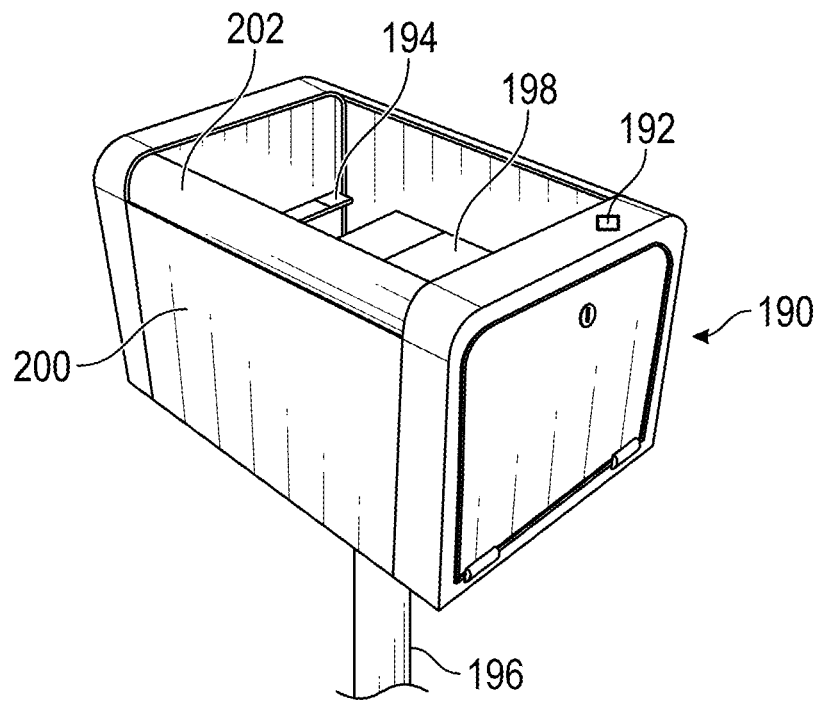
FIGS. 4A and 4B depict a perspective view of an embodiment of a lotus mobile delivery receptacle.

FIG. 4A depicts a perspective view of an example lotus mobile delivery receptacle 190. The lotus mobile delivery receptacle 190 can be designed to accept one or more items at a time.

The mobile delivery receptacle 200 can be a lotus mobile delivery receptacle 190 can include a lotus box 201. The lotus box 201 can include one or more doors 202 that open to allow for delivery. The door 202 can be a delivery inlet. The lotus mobile delivery receptacle 190 can include a platform 198. In some embodiments, the platform 198 can be external to the lotus box 201. The platform 198 can be internal to the lotus box, as shown in FIG. 4A. The platform 198 is designed to hold the weight of one or more items. In some embodiments, the platform 198 is designed to hold fifteen pounds of weight but other configurations of maximum weight are contemplated (e.g., one pound, two pounds, three pounds, four pound, six pound, seven pounds, eight pounds, nine pounds, ten pounds, up to ten pounds, up to twenty pounds, up to thirty pounds, up to forty pound, up to fifty pounds, up to sixty pounds, up to seventy pounds, up to eighty pounds, up to ninety pounds, up to one hundred pounds, etc.).

The lotus mobile delivery receptacle 190 can include several features to enhance security. The lotus mobile delivery receptacle 190 can include a stake 196. The lotus mobile delivery receptacle 190 can be secured to the delivery resource (e.g., the mobile object 150) or other structure with the stake 196. The stake 196 can be coupled to the lotus box 201. The stake 196 can be approximately 2 feet tall. Other configurations of dimensions of the stake 196 are contemplated (e.g., one foot, three feet, four feet, five feet, etc.).

The lotus mobile delivery receptacle 190 uses one or more proxy sensors 192 to create a virtual handshake with the autonomous delivery vehicle 100. The proxy sensor 192 can be passive. The proxy sensor 192 can identify the location of lotus mobile delivery receptacle 190. The proxy sensor 192 can be embedded within the lotus mobile delivery receptacle 190 to communicate with the autonomous delivery vehicle 100. The proxy sensor 194 can be coupled to the one or more doors 202. The proxy sensor 194 can be coupled to the platform 198. The proxy sensor 192 can interact with the target sensor 110 of the autonomous delivery vehicle 100. The proxy sensor 192 may have an RF tag storing specific instructions. The target sensor 110 can activate the tag, in the case of a passive RF tag, read the emitted signal from the RF tag, and transmit the information from the emitted signal to the central computer 102. The proxy sensor 192 can provide information when activated or pinged by the autonomous delivery vehicle 100.

The autonomous delivery vehicle 100 can be an aerial autonomous delivery vehicle. The autonomous delivery vehicle 100 can fly overhead and obtain the necessary geospatial information for delivery by pinging the proxy sensor 192. The proxy sensor 192 can indicate the position of the lotus mobile delivery receptacle 190 when pinged by the autonomous delivery vehicle 100. The proxy sensor 192 can be in or on the lotus mobile delivery receptacle 190. Upon communication with the autonomous delivery vehicle 100, the lotus mobile delivery receptacle 190 can open for deposit of the item. In some embodiments, the autonomous delivery vehicle 100 opens the one or more doors 202. In some embodiment, the one or more doors 202 are in a normally open position, or remain open until delivery of an item. The one or more doors 202 may open in response to a detection by the proxy sensor 192 that the autonomous delivery vehicle 100 is within a threshold distance from the lotus mobile delivery receptacle 190. As described herein, additional assurances may be made that the autonomous delivery vehicle 100 is close enough and/or that the correct autonomous delivery vehicle 100 is in proximity (e.g., by verifying with a central server).

Figure 4B:
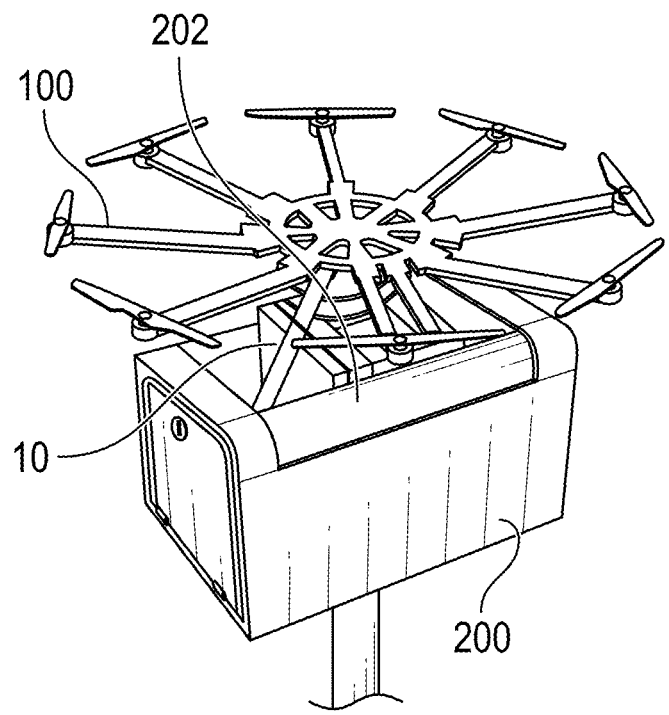

As shown in FIG. 4B, the autonomous delivery vehicle 100 can position itself over the opening in the lotus box 200 and insert the item 10 to be delivered into the lotus box 200. The lotus mobile delivery receptacle 190 can close once the presence sensor 194 detects the item. In some embodiments, the autonomous delivery vehicle 100 causes one or more arms 204 to retract from the one or more doors 202 and into the lotus box 200. In some embodiments, the autonomous delivery vehicle 100 closes the one or more doors 202. In some embodiment, the one or more doors 202 remain open after delivery of an item. In some embodiments, the autonomous delivery vehicle 100 sends a signal to a motor or other device capable of providing a motive force to the doors 202 of the receptacle. This signal can cause the doors 202 to open in response to the presence of the autonomous delivery vehicle 100. In some embodiments, the lotus mobile delivery receptacle 190 can comprise a sensor 194 which detects a presence of one or more items in the lotus mobile delivery receptacle 190. The sensor 194 can detect the weight of the one or more items. Other sensors may be included in the lotus box 201, such as a pressure or force sensor.

The lotus mobile delivery receptacle 190 can use mechanical energy to open or close the lotus mobile delivery receptacle 190, such as by opening or closing one or more doors 202 and/or one or more arms 204. For instance, the weight of the item on the platform 198 can exert a force on the platform 198, which is mechanically coupled to the doors 202, and the downward force of the item will cause the one or more doors 202 to close. For instance, the weight of the item can open the one or more doors 202 and/or one or more arms 204 of the lotus mobile delivery receptacle 190. The lotus box 201 can close using stored mechanical energy once an item of significant size triggers the lotus box 201. In some embodiments, the lotus box 201 is open. The lotus box 201 can close when the weight of the item triggers an internal mechanism of the lotus box 201.

The weight of the item can close the doors 202. For instance, the lotus box 201 can include springs that bias doors 202 to close upon the delivery of an item. For instance, the lotus box 201 can include shock system that lowers the item downward through the one or more open doors 202 upon the delivery of an item. The lotus box 201 can include any internal mechanism that can convert the weight or pressure of the item into movement of one or more doors 202. As one example, the potential energy of the item based on the weight will transform into kinetic energy to close the lotus box 201. In some embodiments, the maximum weight that the platform 198 can hold does not include the lotus box 201. Other configurations are contemplated. The lotus box 201 can close when one or more sensors triggers an internal mechanism of the lotus box 201.

The lotus mobile delivery receptacle 190 can include several features to retrieve one or more items. The user can cause the lotus box 202 to reopen. In some methods of use, the doors 202 remain open after delivery of an item. In other methods of use, the doors 202 are closed after delivery on an item. The user can open the lotus box 201 with a user input, such as a key or keypad. The lotus mobile delivery receptacle 190 can include any feature of any mobile delivery receptacle described herein.

Additional examples of configurations of mobile delivery receptacles can be seen by applying mobile functionality to the various autonomous delivery drop points discussed in U.S. Patent Application Publication No. 2018/0186454, filed Jan. 3, 2018, entitled "DELIVERY DROP POINTS FOR AUTONOMOUS DELIVERY VEHICLES," which is hereby incorporated by reference herein in its entirety and for all purposes. Examples of proxy sensors is also disclosed therein.

Figure 5B:
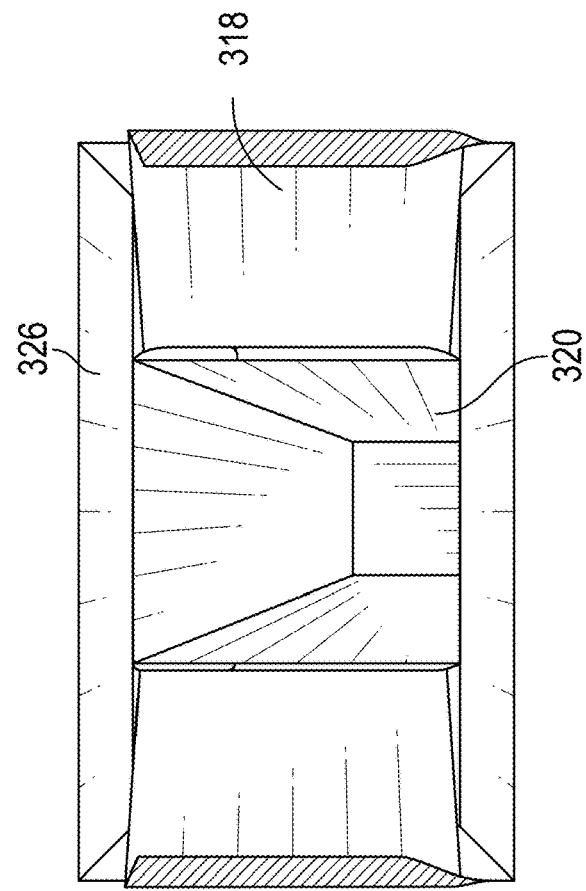
FIG. 5B depicts a perspective view of the embodiment of the delivery chute of FIG. 5A.
Figure 5A:
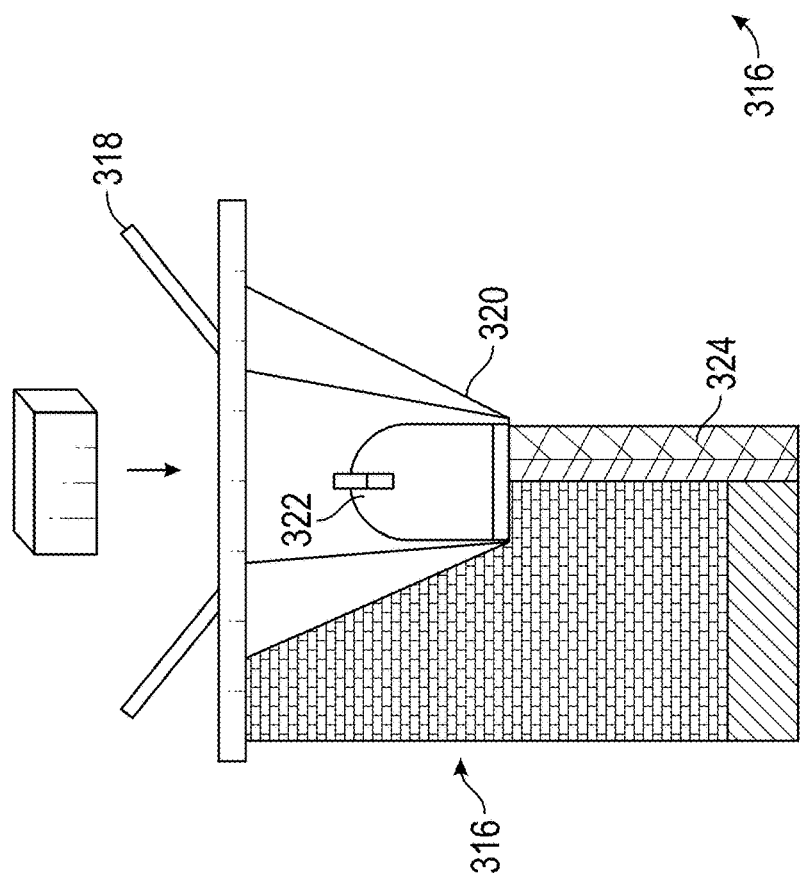
FIG. 5A depicts a view of an embodiment of a delivery chute that can be used in a mobile delivery receptacle.
Figure 6:
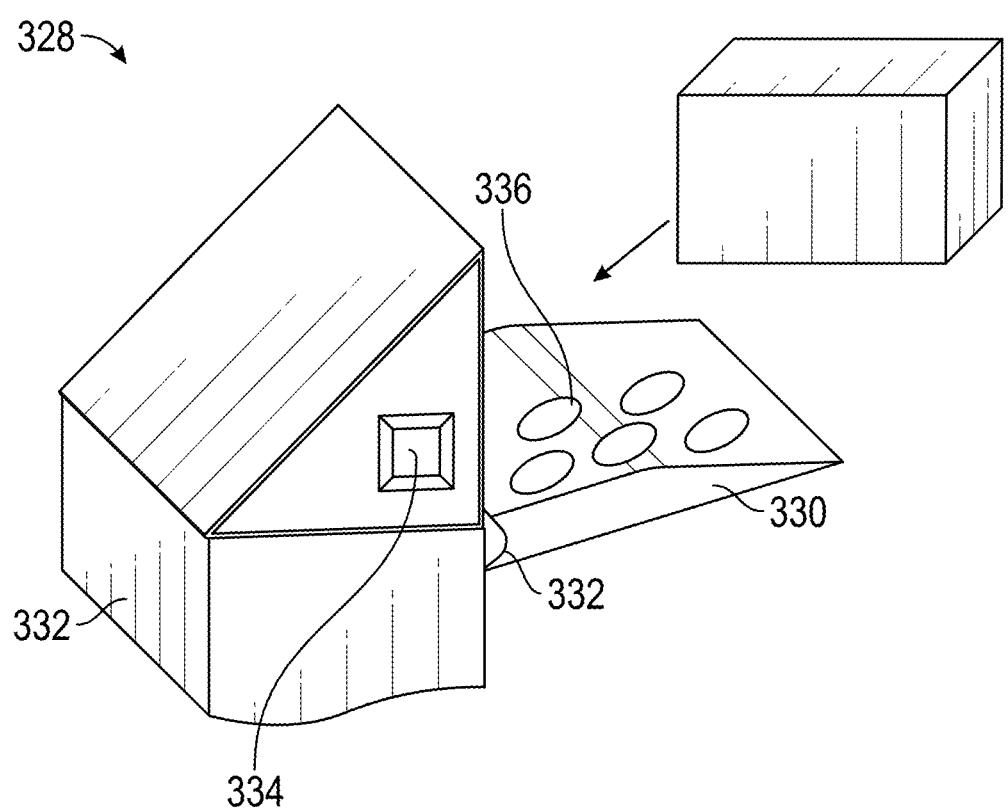
FIG. 6 depicts a perspective view of an embodiment of a scoop drop box embodiment of a mobile delivery receptacle.

FIGS. 5A and 5B depict an example delivery chute 316 that may be used in any mobile delivery receptacle described herein. The delivery chute 316 can be used for aerial delivery. The delivery chute 316 can be use with the aerial autonomous delivery vehicle 100. The delivery chute 316 can be used with ground-based delivery. The delivery chute 316 can be use with any autonomous delivery vehicle 100 delivering from above the delivery chute 316. The delivery chute 316 can allow the autonomous delivery vehicle 100 to drop the item into the mobile delivery receptacle.

The delivery chute 316 can include one or more features to enhance security. The delivery chute 316 can include a door 318. The door 318 can be automated. The door 318 can provide protection for deliveries and items stored within the delivery chute 316. The door 318 can provide protection from adverse, unauthorized access. The door 318 can provide protection from thieves. The door 318 can provide protection from wildlife. The door 318 can provide protection from inclement weather. The door 318 can require a power connection in order for the door 318 to be automated. The door 318 can be triggered by a signal (e.g., a proximity signal, as discussed herein) from the autonomous delivery vehicle 100. The delivery chute 316 can open the door 318 (e.g., automatically) to receive the item. In some embodiments, the door 318 is hinged.

The delivery chute 316 can include some innate item braking. The delivery chute 316 can include sloped chute walls 320. The chute walls 320 can taper inward from the door toward the attached mobile object (e.g., automobile, drone, etc.). For mail or non-fragile items, the delivery chute 316 can be a simple, low-tech delivery system and method. The delivery chute 316 can funnel deliveries toward an access door 322. The access door 322 can allow the owner or occupant to access the items within the delivery chute 316.

The delivery chute 316 can include the necessary support system for the weight of the items. The delivery chute 316 can include a support post 324. The owner could provide support system. The owner could decorate the support post 324 or other support system. The delivery chute 316 may come without the support post 324. The carrier, such as the USPS, could provide guidelines for the support post or other support system such as height and location.

The delivery chute 316 can include a platform 326. For airborne or aerial delivery by the autonomous delivery vehicle 100, the platform 326 can provide a weather-proofed deposit method. The delivery chute 316 can include a high tolerance, strengthened, sturdy material suitable for receipt of items that may be heavy, bulky, sharp, and the like. The platform 326 can provide a landing spot for low-battery level or damaged autonomous delivery vehicle 100, where the autonomous delivery vehicle 100 could be charged. The platform 326 can send a signal to the distribution network that a damaged or low battery autonomous delivery vehicle 100 is on the platform 326, to request assistance.

FIG. 4 depicts a scoop drop box 328 that can serve as another example of a mobile delivery receptacle. The scoop drop box 328 can receive delivery from any autonomous delivery vehicle 100. The scoop drop box 328 can allow the autonomous delivery vehicle 100 to drop the item into the scoop drop box 328. The scoop drop box 328 can be similar in design to current self-service item drop-offs or other item drop-offs, such as USPS mail drop boxes. The scoop drop box 328 can operate in a similar manner to the self-service item drop-offs.

The scoop drop box 328 can include one or more features to enhance security. The scoop drop box 328 can include a door 330. The door 330 can be automated. The door can be hinged with hinge 332. The door 330 can provide protection for deliveries and items stored within the scoop drop box 328. The door 330 can provide protection from adverse, unauthorized access. The door 330 can provide protection from thieves. The door 330 can provide protection from wildlife. The door 330 can provide protection from inclement weather. The door 330 can require a power connection in order for the door 330 to be automated. The door 330 can be triggered by a signal from the autonomous delivery vehicle 100. The scoop drop box 328 can open the door 330 to receive the item. The door 330 can be hinged. The door 330 can be triggered by a signal from the autonomous delivery vehicle 100 to automatically lower the door 330.

As the door 330 is closed, the item can slide within the scoop drop box 328. The door 330 can function as a ramp.

The item can slide along the door 330. As the door 330 is closed, the door 330 can taper inward toward the ground. The item could proceed through a chute (not shown) to a receptacle 332. The chute could be a mechanically lowered chute. The door 330 can facilitate the receipt of delivery. The scoop drop box 328 can include suitable receptacle 332 for the one or more items.

The scoop drop box 328 can include a central identification chip 334. The central identification chip 334 can be weather protected such as through a protective casing. The central identification chip 334 can be affixed to the exterior of a target such as the scoop drop box 328, a storage receptacle or mobile delivery receptacle. The central identification chip 334 can provide information to the autonomous delivery vehicle 100. The information can include information in a propriety format. Examples include one or more dimensions of the storage receptacle, one or more dimensions of the mobile delivery receptacle, location, and residence information such as owner identification or owner name. The central identification chip 334 can be designed to connect with other features such as a lock, alarm, and sensor including proxy sensor and pressure sensor. The central identification chip 334 can be designed to provide security.

FIGS. 7-10 illustrate example embodiments of item lowering systems that may be used in mobile delivery receptacles described herein. Some mobile delivery receptacle or other infrastructure described herein can require lowering of an item from the height of delivery. The item lowering system can lower the item to an accessible height for the recipient. The item lowering system can be used with aerial deliveries from the autonomous delivery vehicle 100. The item lowering system can ensure that fragile items are not damaged. Several different devices can be used as item lowering systems. Several different methods can be used to lower one or more items.

Figure 7:
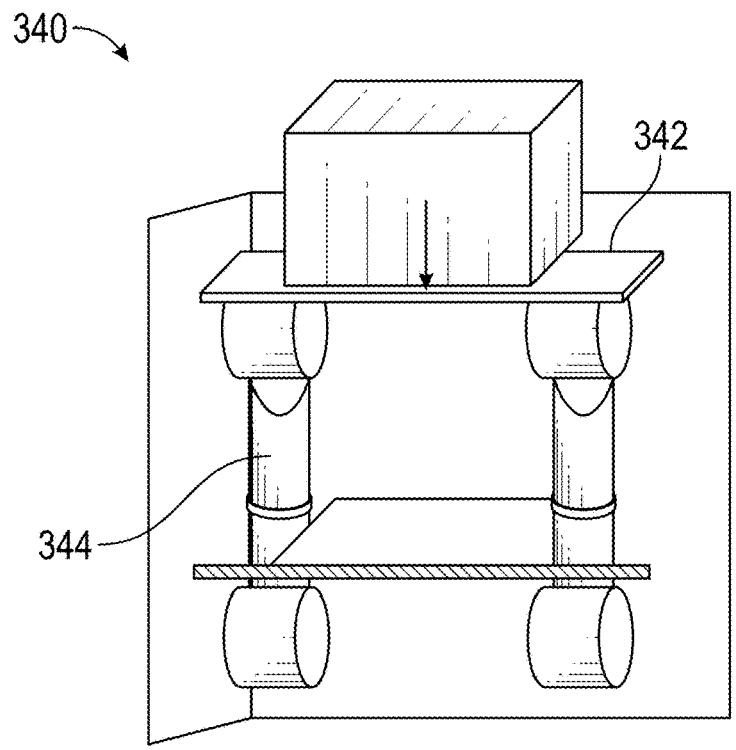
FIG. 7 depicts a perspective view of an embodiment of a weighted pneumatic arm.

FIG. 7 depicts a pneumatic item lowering system 340. The pneumatic item lowering system 340 can use the weight of the item to lower the item. The pneumatic item lowering system 340 can lower under the force of gravity. The mobile delivery receptacle or other infrastructure can require a method to safely lower items. The items can weigh up to a maximum weight. In some embodiments, the maximum weight is ten pounds, twenty pounds, thirty pounds, forty pound, fifty pounds, sixty pounds, seventy pounds, eighty pounds, ninety pounds, or one hundred pounds. Other configurations are contemplated. The items can be lowered to an accessible height. The items can be lowered into the mobile delivery receptacle. The items can be lowered into a storage receptacle. The items can be lowered through a door or port. The pneumatic item lowering system 340 can be used if the drop-off point from the autonomous delivery vehicle 100 is initially too high.

The pneumatic item lowering system 340 can include a platform 342 for the item. The pneumatic item lowering system 340 can include the proxy sensor, such as an active or passive proxy sensor. The proxy sensor can be located on the platform 342. The pneumatic item lowering system 340 can be a logical place to place a customer notification sensor to provide an indication that the item has arrived. The customer notification sensor can provide a ping or other signal when the item has arrived. The pneumatic item lowering system 340 can include a sensor that can detect whether the mobile delivery receptacle is full. The pneumatic item lowering system 340 can prevent delivery of additional items if the mobile delivery receptacle is full.

The pneumatic item lowering system 340 can include one or more components to lower the items. The pneumatic item lowering system 340 can include neutrally weighted pneumatic arms 344. The pneumatic item lowering system 340 can include screw or spring tensioned jacks. The pneumatic item lowering system 340 can include counterweighted elevators. The pneumatic item lowering system 340 can include a pseudo Archimedes screw.

Figure 8:
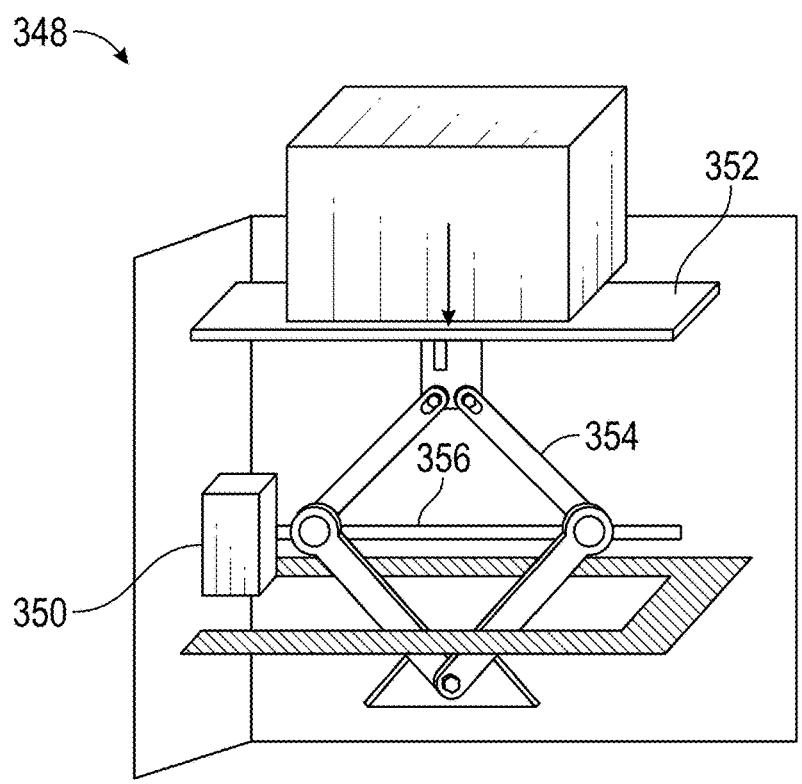
FIG. 8 depicts a perspective view of an embodiment of a scissor jack.

FIG. 8 depicts a scissor jack item lowering system 348. The scissor jack item lowering system 348 can include a mechanical scissor jack. The scissor jack item lowering system 348 can include a motor coupled to the mechanical scissor jack. The scissor jack item lowering system 348 can be raised or lowered. The mobile delivery receptacle or other infrastructure can require a method to safely lower items. The items can weigh up to a maximum weight. The items can be lowered into the mobile delivery receptacle. The items can be lowered into a storage receptacle. The items can be lowered through a door or port. The scissor jack item lowering system 348 can be used if the drop-off point from the autonomous delivery vehicle 100 is initially too high.

The scissor jack item lowering system 348 can require energy among the smallest energy amounts of various lifting mechanisms. The scissor jack item lowering system 348 can include very few parts for maintenance. The motor 350 can require an energy source, such as a 12 V energy source. The scissor jack item lowering system 348 can require less energy that the 12 V energy source. The scissor jack item lowering system 348 can include a platform 352. The scissor jack item lowering system 348 can include the scissor jack 354. The scissor jack 354 can include one or more intersecting arms or linkages. The scissor jack 354 can include a four bar linkage. The motor 350 can be coupled to a lead screw 356. The lead screw 356 can cause the expansion or collapse of the linkages. The scissor jack item lowering system 348 can be raised or lowered by rotating the lead screw in opposite directions.

Figure 9:
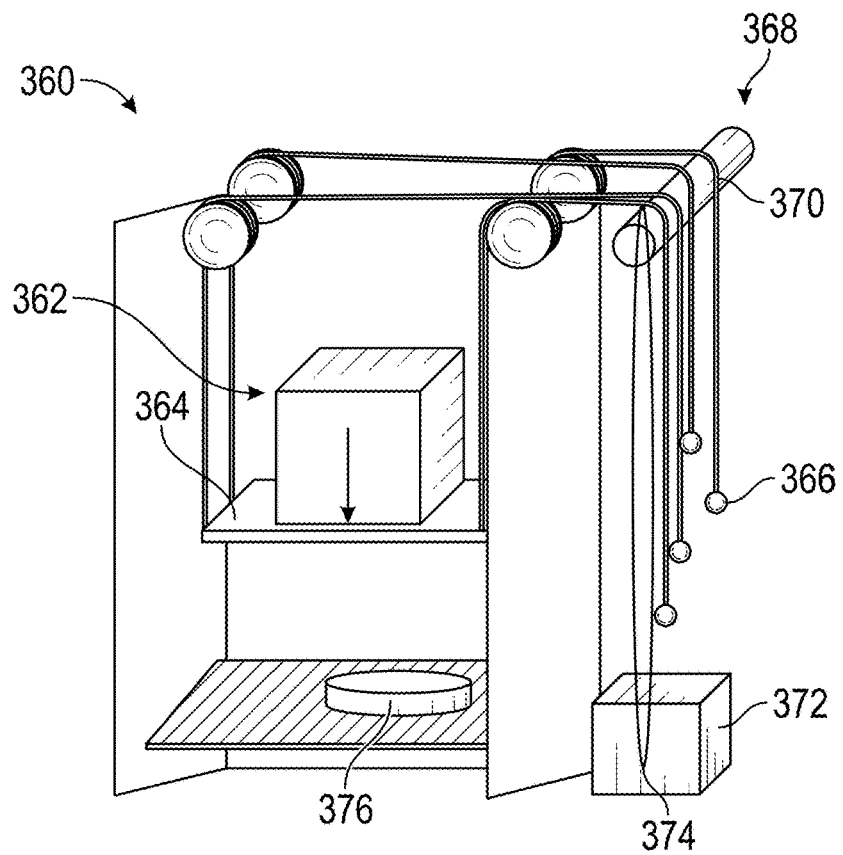
FIG. 9 depicts a perspective view of an embodiment of a pulley lowering system.

FIG. 9 depicts a pulley item lowering system 360. The pulley item lowering system 360 can include one or more pulleys. The pulley item lowering system 360 can be raised or lowered. The mobile delivery receptacle or other infrastructure can require a method to safely lower items. The items can weigh up to a maximum weight. The items can be lowered into the mobile delivery receptacle. The items can be lowered into a storage receptacle. The items can be lowered through a door or port. The pulley item lowering system 360 can be used if the drop-off point from the autonomous delivery vehicle 100 is initially too high.

The pulley item lowering system 360 can operate as an elevator. The pulley item lowering system 360 can be open from the top to receive items. The pulley item lowering system 360 can received items from the autonomous delivery vehicle 100. The pulley item lowering system 360 can be different than other elevators that have lift mechanism directly above the carriage 362. The pulley item lowering system 360 can be open from the top and thus the lift mechanism is not directly above the carriage 362. The carriage 362 can include a platform 364. The items can be delivered to the platform 364.

The pulley item lowering system 360 can include one or more pulleys 366. The pulleys can be part of an axle pulley system 368. The axle pulley system 368 can be a complex set of pulleys and axles that can allow the carriage 362 to move up and down. FIG. 9 depicts an axle 370. The pulley item lowering system 360 can include a motor 372. The pulley item lowering system 360 can include a gear chain 374. The pulley item lowering system 360 can include a counterweight 376.

Figure 10:
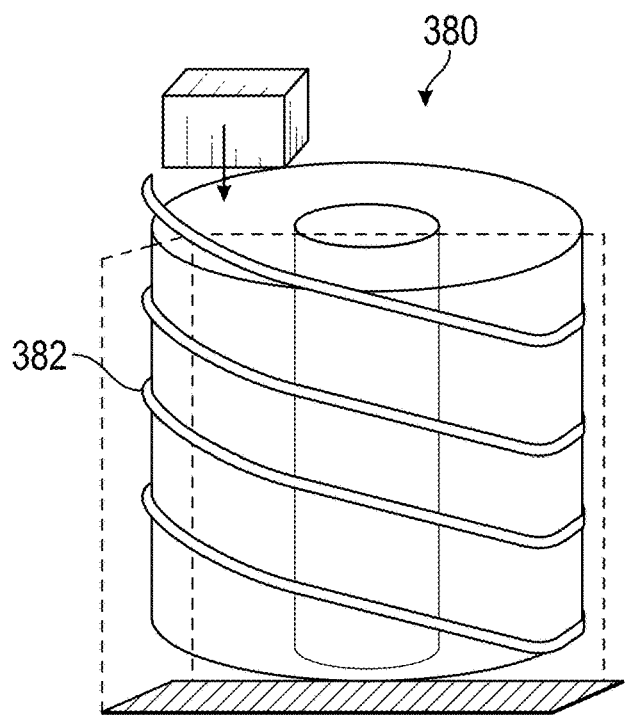
FIG. 10 depicts a perspective view of an embodiment of a screw shaped slide.

FIG. 10 depicts a screw slide lowering system 380. The screw slide lowering system 380 can lower items under the influence of gravity. The mobile delivery receptacle or other infrastructure can require a method to safely lower items. The items can weigh up to a maximum weight. The items can be lowered into the mobile delivery receptacle. The items can be lowered into a storage receptacle. The items can be lowered through a door or port. The screw slide lowering system 380 can be used if the drop-off point from the autonomous delivery vehicle 100 is initially too high.

The screw slide lowering system 380 can include a slide 382. The slide 382 can be in the shape of a screw or helix. The slide 382 can wind around the center of mobile delivery receptacle. The screw slide lowering system 380 can move an item from a certain height to a lower height. The screw slide lowering system 380 can include friction braking to slow the velocity of the item. The slide 382 can include friction braking. The braking for items can be accomplished through a textured surface of the slide 382. The braking can include a cushioned base. The screw slide lowering system 380 can minimize the powered components.

Some nonlimiting examples of embodiments described above are listed below.

In a 1st example, a mobile delivery receptacle comprises: a housing having an internal volume configured to store delivery items therein; a mount coupled to the housing, the mount configured to attach the housing to a mobile object; a receiving device connected to an opening of the housing, the receiving device configured to: receive, in a receiving configuration, a delivery item therein; pass received delivery items to the volume of the housing; and prevent, in a closed configuration, removal of the delivery item from the receiving device; a remote sensor coupled to the housing, the remote sensor configured to determine whether objects are within a threshold distance from the housing; and a locking mechanism configured to prevent unauthorized access into the interior of the housing.

In a 2nd example, the mobile delivery receptacle of Example 1, wherein the receiving device comprises an extendable net.

In a 3rd example, the mobile delivery receptacle of any of Examples 1-2, wherein the receiving device comprises a helical slide.

In a 4th example, the mobile delivery receptacle of any of Examples 1-3, wherein the receiving device comprises a locking mechanism.

In a 5th example, the mobile delivery receptacle of Example 4, wherein the locking mechanism is configured to open in response to a determination that a delivery device is closer than a threshold distance from the mobile delivery receptacle.

In a 6th example, the mobile delivery receptacle of any of Examples 1-5, wherein the receiving device comprises one or more arms configured to accept the item.

In a 7th example, the mobile delivery receptacle of any of Examples 1-6, wherein the mobile delivery receptacle enters a closed configuration based on a weight of the delivery item.

In an 8th example, the mobile delivery receptacle of any of Examples 1-7, further comprising a sensor configured to detect the presence of a delivery item within the housing.

In a 9th example, the mobile delivery receptacle of any of Examples 1-8, further comprising a charging port.

In a 10th example, the mobile delivery receptacle of any of Examples 1-9, further comprising an item lowering system configured to lower the item from a first height to a second height.

In a 11th example, the autonomous delivery receptacle of any of Examples 1-10, wherein the system is configured to receive the item from an autonomous delivery vehicle.

In a 12th example, a mobile deposit device comprising: a container having an interior configured to store delivery items therein; a location determination unit configured to identify a geographic location of the container device; a remote sensor configured to determine whether objects are within a threshold distance from the container; and a mount connected to the container and configured to attach the container to a mobile object; and a locking mechanism configured to prevent unauthorized access into the interior of the container.

In a 13th example, the mobile deposit device of Example 12, wherein the receiving device comprises an extendable net.

In a 14th example, the mobile deposit device of any of Examples 12-13, further comprising a data interface configured to communicate with a remote computer.

In a 15th example, the mobile deposit device of any of Examples 12-14, wherein the receiving device comprises a locking mechanism configured to open the container in response to a signal received from the remote computer.

In a 16th example, the mobile deposit device of any of Examples 12-15, wherein the locking mechanism is configured to open in response to a determination by the location determination unit that the mobile deposit device is closer than a threshold distance from a point of interest.

In a 17th example, the mobile deposit device of Example 16, wherein point of interest comprises a building.

In a 18th example, the mobile deposit device of any of Examples 12-17, wherein the locking mechanism is configured to remain closed until the mobile deposit device determines an identity of an item deliverer.

In a 19th example, the mobile deposit device of any of Examples 12-18, further comprising a door configured to open in response to a determination by the location determination unit that the mobile deposit device is within a target latitude range and a target longitude range.

In a 20th example, the mobile deposit device of any of Examples 12-19, further comprising user interface configured to allow a user access into the container thereby.

In a 21st example, the mobile deposit device of any of Examples 12-20, further comprising a fingerprint identification unit configured to verify an identity of an individual.

In a 22nd example, a method of delivering an item to a mobile delivery receptacle, the method comprising: receiving from a mobile delivery receptacle a location of the mobile delivery receptacle; based on a cross-referencing credential, verifying the location of the mobile delivery receptacle; identifying a mobile delivery unit; determining a position of the mobile delivery unit; calculating a delivery route from the position of the mobile delivery unit to the mobile delivery receptacle; passing the location of the delivery resource and the delivery route to the mobile delivery unit.

In a 23rd example, the method of Example 22, wherein the cross-referencing credential comprises a previously received location of the mobile delivery receptacle.

In a 24th example, the method of any of Examples 22-23, wherein the cross-referencing credential comprises an approximation of a location based on at least one of a signal from a cell tower or a mac address of the mobile delivery receptacle.

In a 25th example, the method of any of Examples 22-24, further comprising verifying an identity of an individual.

In a 26th example, the method of Example 25, wherein verifying the identity of the individual comprises receiving a fingerprint of the individual.

In a 27th example, the method of Example 25, wherein verifying the identity of the individual comprises receiving a passcode from the individual via a display interface.

In a 28th example, the method of any of Examples 22-27, further comprising locking the mobile delivery receptacle.

In a 29th example, the method of any of Examples 22-28, further comprising determining a distance of the delivery resource from a point of interest.

In a 30th example, the method of any of Examples 22-29, wherein the point of interest comprises a stationary object.

In a 31st example, the method of any of Examples 22-30, further comprising communicating with a remote computer.

In a 32nd example, the method of Example 31, wherein communicating with the remote computer comprises verifying information received from the mobile delivery receptacle.

In a 33rd example, the method of any of Examples 22-32, further comprising passing authorization credentials to the mobile delivery unit.

In a 34th example, the method of any of Examples 22-33, further comprising passing authorization credentials to the mobile delivery receptacle.

In a 35th example, a mobile deposit system comprising: a mobile delivery unit comprising a location sensor and a computer; a mobile delivery receptacle configured to receive one or more delivery items therein, the mobile delivery receptacle comprising: a proximity sensor configured to identify a location of a mobile delivery unit; and a receiving device configured to be in an open state and a closed state; and a controller in communication with both the proximity sensor and the receiving device, the controller configured to cause the receiving device to enter an open state; and a computer disposed remotely from both the mobile delivery unit and the mobile delivery receptacle, the computer configured to pass verification information to the mobile delivery receptacle.

In a 36th example, a method of registering a mobile delivery receptacle, the method comprising: receiving a request to link a mobile delivery receptacle with a remote computer; receiving an identification of the mobile delivery receptacle; and passing verification credentials to the mobile delivery receptacle.

In a 37th example, a method of rerouting delivery of items to a mobile delivery receptacle, the method comprising: receiving authorization credentials from a user; receiving location information of the mobile delivery receptacle; and passing a confirmation of receipt of information.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7 ®, i5®, or i3® processor, an AMD Phenom®, A-series® or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A computer-implemented method of delivering an item to a mobile delivery receptacle using a network of computing devices, the method comprising:
receiving, via a user interface, user credentials;
transmitting the user credentials to a server of a distribution network;
registering, based on the user credentials, a unique identifier disposed on the mobile delivery receptacle;
receiving, via the user interface, information indicative of an address of a recipient;

transmitting the information indicative of the address of the recipient to the server of the distribution network;

associating the unique identifier with the address of the recipient;

receiving, via the user interface, a scan of the unique identifier on the mobile delivery receptacle, wherein the scan of the unique identifier occurs at an updated delivery location which is different than the address of the recipient, and wherein the updated delivery location corresponds to a current location of the mobile delivery receptacle;

transmitting the scan of the unique identifier and the updated delivery location to the server of the distribution network;

associating, in the server, the item with the updated delivery location;

receiving, in item processing equipment of the distribution network, an item having the address of the recipient thereon;

generating, by the server, based on the address of the recipient and the updated delivery location, routing instructions for a delivery resource to deliver the item to the updated delivery location;

transmitting, to the delivery resource, the routing instructions;

controlling, using a processor of the delivery resource and based on the routing instructions, the delivery resource to the updated delivery location;

receiving, using a location sensor of the delivery resource, a specific location of with the mobile delivery receptacle from a proxy sensor of the mobile delivery receptacle;

receiving, by the delivery resource, the unique identifier of the mobile delivery receptacle; and releasing, using the delivery resource and based on the specific location and the unique identifier, the item into a receiving device of the mobile delivery receptacle.

2. The method of claim 1, further comprising receiving, via the user interface, the unique identifier for the mobile delivery receptacle.

3. The method of claim 2, further comprising, receiving, via a user interface, a user's request to further update the updated delivery location of the mobile delivery receptacle.

4. The method of claim 2, wherein scanning the unique identifier comprises scanning an image of the unique identifier located on the mobile delivery receptacle.

5. The method of claim 1, wherein transmitting the routing instructions comprises:
identifying the delivery resource to deliver the item to the mobile delivery receptacle based on the updated delivery location;
determining a delivery route from a location of the delivery resource to the updated delivery location; and
sending the delivery route to the identified delivery resource.

6. The method of claim 3, wherein the request to further update the updated delivery location of the mobile delivery receptacle is received from a user's mobile computing device.

7. The method of claim 1, wherein the information indicative of the updated delivery location of the mobile delivery receptacle is received from a location circuit of the user's mobile computing device.

8. The method of claim 7, wherein the information indicative of the updated delivery location of the mobile delivery receptacle corresponds with a current location of the user's mobile computing device.

9. The method of claim 7, wherein the unique identifier scanned at a updated delivery location corresponds with a current location of the user's mobile computing device.

10. A system for delivering an item, the system comprising:
a memory storing:
a plurality of unique identifiers for mobile delivery receptacles;
associations between the plurality of unique identifiers and a plurality of user credentials; and
location information for the mobile delivery receptacles;
a user interface configured to receive, from a user:
a request to update the location of a mobile delivery receptacle;
the user's user credentials;
information indicative of an address of a recipient; and
one or more processors configured to:
query the memory to determine a unique identifier associated with the received user credentials;
receive the unique identifier scanned at an updated delivery location different than the address of the recipient;
associate the unique identifier with the address of the recipient;
receive a scan of the unique identifier on the mobile delivery receptacle, wherein the scan of the unique identifier occurs at the updated delivery location, and wherein the updated delivery location corresponds to a current location of the mobile delivery receptacle;
transmit the scan of the unique identifier and the updated delivery location to a server of a distribution network;
associate in the server, based on the address of the recipient and on the scan of the unique identifier, the item with the updated delivery location, wherein the updated delivery location corresponds to a current location of a mobile delivery receptacle;
generate routing instructions for a delivery resource to the updated delivery location based on the address of the recipient and the updated delivery location;
transmit, to the delivery resource, the routing instructions;
control, based on the routing instructions, the delivery resource to the updated delivery location;
receive, using a location sensor of the delivery resource, a specific location of with the mobile delivery receptacle from a proxy sensor of the mobile delivery receptacle;
receive, by the delivery resource, the unique identifier of the mobile delivery receptacle; and
release, using the delivery resource and based on the specific location and on the unique identifier, the item into a receiving device of the mobile delivery receptacle.

11. The system of claim 10, wherein the user interface is further configured to receive, from the user, the unique identifier for the mobile delivery receptacle.

12. The system of claim 11, wherein the user interface is further configured to receive, from the user, an image of the unique identifier located on the mobile delivery receptacle.

13. The system of claim 10, wherein the user interface is provided on a user's mobile computing device, wherein the request to update the location of the mobile delivery receptacle is received from the user's mobile computing device, and wherein the information indicative of the location of the mobile delivery receptacle is received from a location circuit of the user's mobile computing device.

14. The system of claim 10, wherein the mobile delivery receptacle comprises:
   a housing having an internal volume configured to store an item therein;
   a mount coupled to the housing, the mount configured to attach the housing to a mobile object;
   a receiving device coupled to the housing, the receiving device having a first end and second end smaller than the first end, the second end configured to guide the item into the internal volume of the housing, the first end configured to receive the item therethrough and to direct the item through the second end;
   a computer readable code located thereon, the computer readable code comprising the unique identifier;
   a sensor coupled to the housing, the sensor configured to communicate the unique identifier to the delivery resource; and
   a locking mechanism configured to prevent unauthorized access into the internal volume of the housing.

15. The mobile delivery receptacle of claim 14, wherein the sensor comprises an active sensor configured to broadcast the unique identifier to the delivery resource.

16. The mobile delivery receptacle of claim 15, wherein the active sensor is further configured to receive a confirmation signal from the delivery resource, and to unlock the locking mechanism in response to the confirmation signal.

17. The mobile delivery receptacle of claim 14, further comprising a processor in communication with the sensor, wherein the processor is configured to connect to a vehicle via a wireless short range communication protocol.

18. The mobile delivery receptacle of claim 17, wherein the processor is further configured to communicate information indicative of the connection with the vehicle to the delivery resource.

* * * * *